(12) United States Patent
Isshiki

(10) Patent No.: US 8,547,566 B2
(45) Date of Patent: Oct. 1, 2013

(54) IMAGE PROCESSING APPARATUS IN PULL PRINTING SYSTEM, AND METHOD OF CONTROLLING IMAGE PROCESSING APPARATUS

(75) Inventor: Naohiro Isshiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 656 days.

(21) Appl. No.: 12/751,924

(22) Filed: Mar. 31, 2010

(65) Prior Publication Data

US 2010/0253964 A1    Oct. 7, 2010

(30) Foreign Application Priority Data

Apr. 2, 2009   (JP) .................................. 2009-090288

(51) Int. Cl.
*G06K 15/00* (2006.01)
(52) U.S. Cl.
USPC .................. 358/1.14; 358/1.15; 726/5; 726/6
(58) Field of Classification Search
USPC ....................................................... 358/1.14
See application file for complete search history.

(56) References Cited

U.S. PATENT DOCUMENTS

2008/0028449 A1* 1/2008 Shigeeda et al. .................. 726/6

FOREIGN PATENT DOCUMENTS

| JP | 2005-338398 A | 12/2005 |
|---|---|---|
| JP | 2006-99714 A | 4/2006 |
| JP | 2006099714 A | 4/2006 |
| JP | 2006-119719 A | 5/2006 |
| JP | 2006119719 A | 5/2006 |
| JP | 2006-227707 A | 8/2006 |
| JP | 2006-295529 A | 10/2006 |
| JP | 2006-350497 A | 12/2006 |
| JP | 2007-121669 A | 5/2007 |
| JP | 2007249959 * | 9/2007 |
| JP | 2007-307793 A | 11/2007 |
| JP | 2008-40564 A | 2/2008 |
| JP | 2008-41044 A | 2/2008 |
| JP | 2008-71196 A | 3/2008 |
| JP | 2009-64198 A | 3/2009 |
| JP | 2009-66929 A | 4/2009 |

OTHER PUBLICATIONS

English translation of JP2007249959 provided by JPO machine translation on Jan. 6, 2012.*
Japanese Office Action dated Feb. 19, 2013, in counterpart Japanese Application No. 2009-090288.

* cited by examiner

*Primary Examiner* — Marivelisse Santiago Cordero
*Assistant Examiner* — Aaron R Gerger
(74) *Attorney, Agent, or Firm* — Fitzpatrick, Cella, Harper & Scinto

(57) ABSTRACT

In a pull printing system, it is possible to perform an alternate print with appropriate security and in consideration of loads on a server while securing convenience of the user requesting a third party for the alternate print. An image processing apparatus in the pull printing system comprises a user authentication unit configured to confirm authority of an alternate process to a first user during login, a bibliographic information managing unit configured to acquire bibliographic information of print data stored in a storage server by a second user from a bibliographic information server for displaying the print data corresponding to the second user and a log information managing unit configured to acquire a log of an operation of the alternate process executed by the first user to the print data corresponding to the second user.

9 Claims, 36 Drawing Sheets

SERVER REGISTRATION INFORMATION

| SERVER | : 192.168.0.1 |
|---|---|

FIG.5

BIBLIOGRAPHIC INFORMATION 600

| | | |
|---|---|---|
| PRINT DATA NAME | : SPECIFICATION 1 | ← 601 |
| STORAGE LOCATION | : 192.168.0.1 | ← 602 |
| USER ID | : kaneko | ← 603 |

FIG.6

BIBLIOGRAPHIC INFORMATION TABLE

| BIBLIOGRAPHIC INFORMATION ID | USER ID | PRINT DATA NAME | STORAGE LOCATION |
|---|---|---|---|
| 02011 | kaneko | SPECIFICATION 1 | 192.168.0.1 |
| 02012 | tanaka | MAP | 192.168.0.2 |
| 02014 | suzuki | RECIPE 1 | 192.168.0.3 |
| 02016 | kaneko | MINUTES | 192.168.0.1 |
| 02020 | kaneko | MANUAL | 192.168.0.1 |
| ... | ... | ... | ... |

FIG.7

BIBLIOGRAPHIC INFORMATION LIST

| BIBLIOGRAPHIC INFORMATION ID | PRINT DATA NAME | STORAGE LOCATION |
|---|---|---|
| 02011 | SPECIFICATION 1 | 192.168.0.1 |
| 02016 | MINUTES | 192.168.0.1 |
| 02020 | MANUAL | 192.168.0.1 |
| ⋮ | ⋮ | ⋮ |

FIG.8

ALTERNATE PASSWORD MANAGING TABLE 900

| USER ID | ALTERNATE PASSWORD | |
|---------|--------------------|---|
| kaneko  | Zzddioa93s33       | 901 |
| tanaka  | dfdIffekks933      | 902 |
| ⋮       | ⋮                  | |

FIG.9

LOG INFORMATION TABLE 1000

| ALTENATED USER ID | ALTERNATE USER ID | DATE AND TIME | OPERATION | BIBLIOGRAPHIC INFORMATION ID |
|---|---|---|---|---|
| kaneko | tanaka | 2008/6/10 14:30 | LOGIN | |
| kaneko | tanaka | 2008/6/10 14:30 | PREVIEW | 02011 |
| kaneko | tanaka | 2008/6/10 14:31 | PRINT | 02011 |
| kaneko | tanaka | 2008/6/10 14:33 | PREVIEW | 02016 |
| suzuki | osada | 2008/6/11 09:15 | LOGIN | |
| ... | ... | ... | ... | ... |

FIG.10

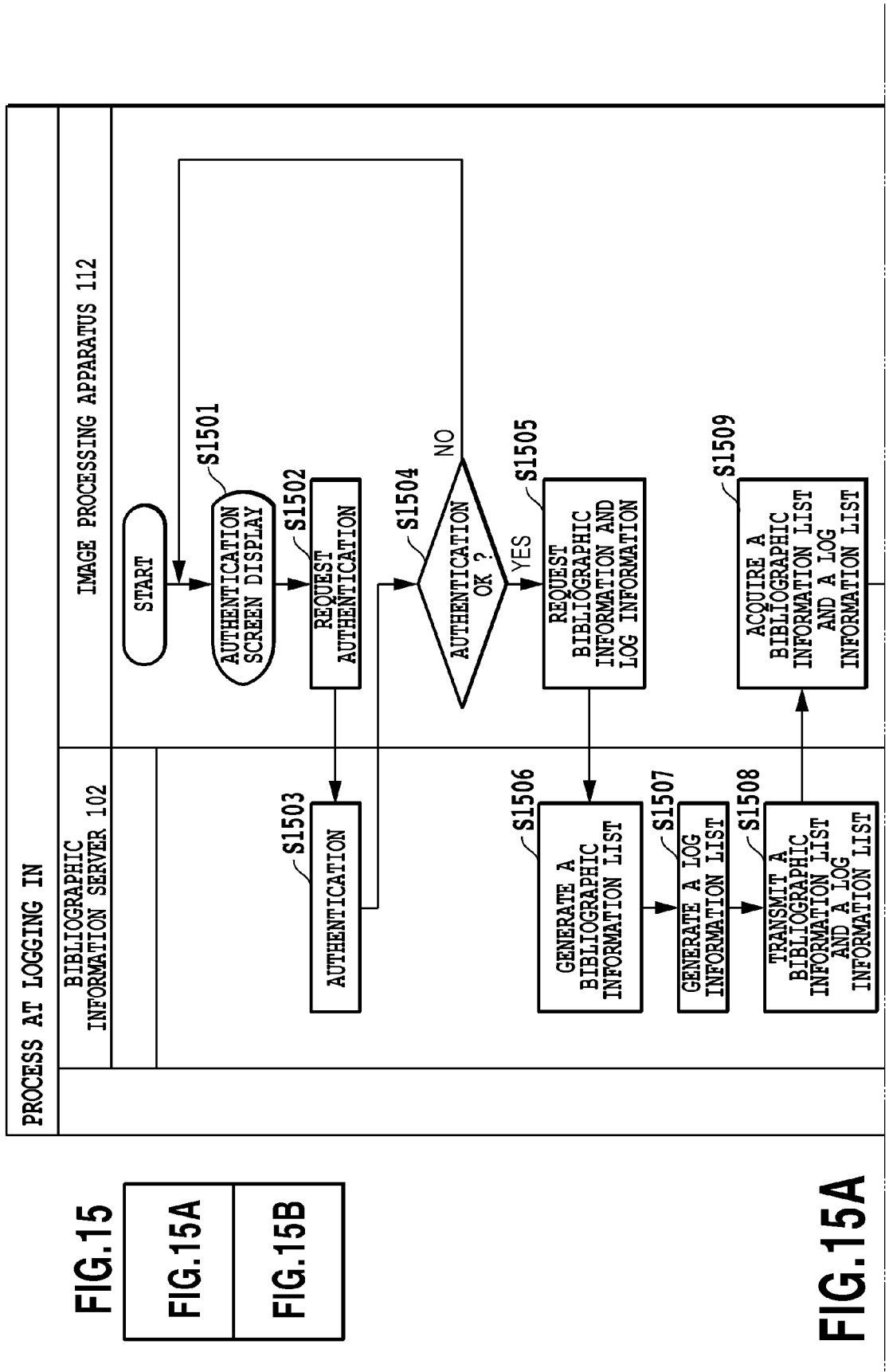

FIG.17

| LOG INFORMATION LIST 1700 | | | |
|---|---|---|---|
| ALTERNATE USER ID | DATE AND TIME | OPERATION | BIBLIOGRAPHIC INFORMATION ID |
| tanaka | 2008/6/10 14:30 | LOGIN | |
| tanaka | 2008/6/10 14:30 | PREVIEW | 02011 |
| tanaka | 2008/6/10 14:31 | PRINT | 02011 |
| tanaka | 2008/6/10 14:33 | PREVIEW | 02016 |
| ... | ... | ... | ... |

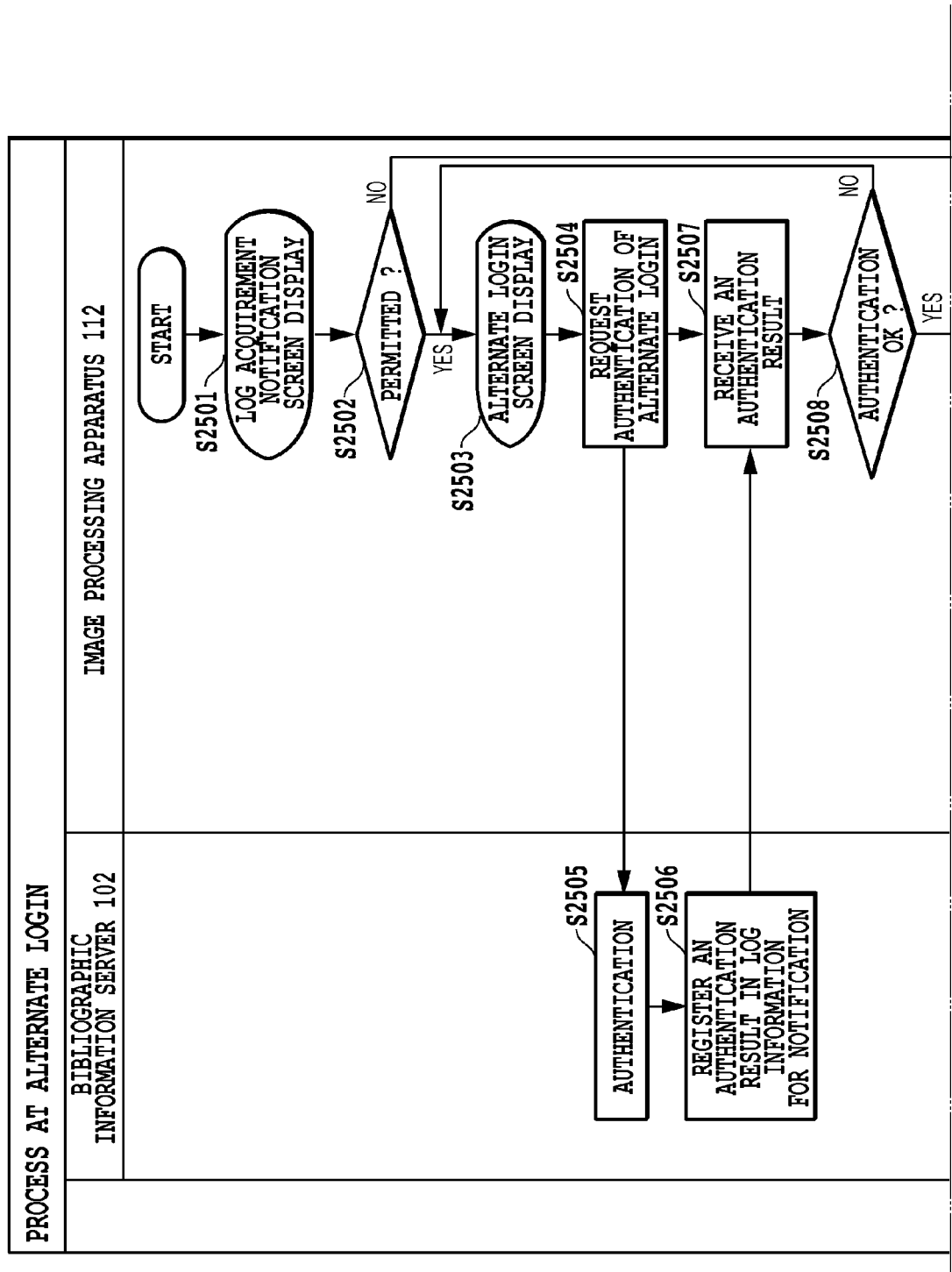

BIBLIOGRAPHIC INFORMATION 3100

| PRINT DATA NAME | : SPECIFICATION 1 | ← 3101 |
|---|---|---|
| STORAGE LOCATION | : 192.168.0.1 | ← 3102 |
| USER ID | : kaneko | ← 3103 |
| ALTERNATE PROCESS NON-PERMISSION FLAG | : ON | ← 3104 |

FIG.31

BIBLIOGRAPHIC INFORMATION TABLE 3200

| BIBLIOGRAPHIC INFORMATION ID | USER ID | PRINT DATA NAME | STORAGE LOCATION | ALTERNATE PROCESS NON-PERMISSION FLAG |
|---|---|---|---|---|
| 02011 | kaneko | SPECIFICATION 1 | 192.168.0.1 | ON |
| 02012 | tanaka | MAP | 192.168.0.2 | OFF |
| 02014 | suzuki | RECIPE 1 | 192.168.0.3 | OFF |
| 02016 | kaneko | MINUTES | 192.168.0.1 | OFF |
| 02020 | kaneko | MANUAL | 192.168.0.1 | OFF |
| ... | ... | ... | ... | ... |

BIBLIOGRAPHIC INFORMATION LIST 3300

| BIBLIOGRAPHIC INFORMATION ID | PRINT DATA NAME | STORAGE LOCATION |
|---|---|---|
| 02016 | MINUTES | 192.168.0.1 |
| 02020 | MANUAL | 192.168.0.1 |
| ⋮ | ⋮ | ⋮ |

FIG.33

IMAGE PROCESSING APPARATUS IN PULL PRINTING SYSTEM, AND METHOD OF CONTROLLING IMAGE PROCESSING APPARATUS

BACKGROUND OF THE INVENTION

1. Field of the Invention

The present invention relates to an alternate printing process in a pull printing system.

2. Description of the Related Art

There is conventionally proposed a pull printing system in which a printing apparatus such as a MFP, a client personal computer (PC) thereof, a bibliographic information server for managing print data and a storage server for storing the print data are connected through a network (refer to Japanese Patent Laid-Open No. 2006-99714).

In this type of pull printing systems, a user stores print data from the PC in the storage server and the whereabouts of the print data and user information are registered in the bibliographic information server for managing the print data. The user performs authentication from an operation panel of the MFP, thereby selecting its print data registered in the bibliographic information server and downloads the data from the storage server for printing.

In the pull printing system as described above, the print data are in advance registered and thereby the user can perform a print of the print data in any image forming apparatus in correspondence to user's convenience or a crowd condition of the image forming apparatus. Therefore, the pull printing system has an advantage that the convenience enhances. Further, in a case of actually printing, since it is usual for a user to use an image forming apparatus by its side, theft of a print document can be prevented.

In this way, the pull printing system is configured such that convenience and security for a user are taken into account, but a user authenticated by user authentication can print only print data registered by its self. Therefore, the user who has registered the print data is also required to make an instruction of print output by user self, raising a problem of being incapable of requesting another user to print in place of the user.

As a conventional method of solving this problem, there is proposed a system in which an alternate user ID and an alternate password are issued, a first user is authenticated with this alternate user ID and the alternate password, and a part of the authority which a second user owns is given to the first user (refer to Japanese Patent Laid-Open No. 2006-119719). The invention described in Japanese Patent Laid-Open No. 2006-119719 is configured such that the first user logs in using the alternate user ID and the alternate password notified by the second user, and thereafter, by inputting the user ID which the first user owns, the first user can acquire alternate authority of the second user.

SUMMARY OF THE INVENTION

However, in a case where the authority of printing the print data of the second user is given to the first user by using the technology of Japanese Patent Laid-Open No. 2006-119719, all the print data registered by the second user are resultantly printable by the first user. In a case of requesting the first user for an alternate print, an event that data except particularly designated data are printed by the first user is not desirable also in terms of security.

On the other hand, it is considered a method in which by applying the technology of the invention described in Japanese Patent Laid-Open No. 2006-119719, alternate user ID and an alternate password forgiving the authority for printing only particular print data designated by the second user are issued, which the first user is made to use. In this case, however, it is required to manage the alternate user ID and the alternate password for each print data, largely damaging convenience of the user.

In addition, the technology of the invention described in Japanese Patent Laid-Open No. 2006-119719 is configured in such a way as to, after passing authentication with the alternate user ID and the alternate password, input ID specific to the first user separately. Therefore, in a case where a third party who does not know the alternate password attempts to acquire the authentication by trial and error, although the log that the login authentication for the alternate process has been attempted remains, it is not possible to know about who has attempted such a login authentication.

Further, the pull printing system is configured such that, for reducing loads of the storage server and the bibliographic information server and for reducing labors and hours of print data management in a user, the registered print data are deleted after they are printed. Therefore, also in a case where the first user prints data except the print data designated by the second user, the corresponding print data are deleted. In consequence, there occurs an event that at the time the second user attempts the printing later, the print data are already deleted and it is not possible to perform the printing.

An image processing apparatus according to the present invention is provided with an image processing apparatus in which a first user during login executes an alternate process of accessing a print data of another second user, the apparatus comprising a deleting unit configured to, when a print of a stored print data is instructed, delete the print data with a selected deleting method, a bibliographic information managing unit configured to, when it is confirmed that the first user during login owns authentication of the alternate process, acquire bibliographic information of the print data stored by the second user for displaying the print data registered by the second user to the first user executing the alternate process of the second user, and a display unit configured to display a list of the bibliographic information of the print data acquired by the bibliographic information managing unit on a display screen, wherein when the first user instructs a print of the print data of the second user displayed on the display unit, the deleting unit does not delete the print data.

According to the present invention, it is possible to perform an alternate print with appropriate security and in consideration of loads on a server while securing convenience of the user requesting a third party for the alternate print.

Further features of the present invention will become apparent from the following description of the exemplary embodiments (with reference to the attached drawings).

BRIEF DESCRIPTION OF THE DRAWINGS

FIG. 5 is a diagram showing an example of server registration information;

FIG. 6 is a diagram showing an example of bibliographic information;

FIG. 7 is a diagram showing an example of a bibliographic information table;

FIG. 8 is a diagram showing an example of a bibliographic information list;

FIG. 9 is a diagram showing an example of an alternate password managing table;

FIG. 10 is a diagram showing an example of a log information table;

FIG. 15 is a flowchart showing the relationship of FIGS. 15A and 15B;

FIGS. 15A and 15B are flow chart showing a series of processes when a user logs in to the image processing apparatus;

FIG. 17 is a diagram showing an example of a log information list;

FIG. 25 is a flowchart showing the relationship of FIGS. 25A and 25B;

FIGS. 25A and 25B are flow chart showing a detail of a process at alternate login;

FIG. 31 is a diagram showing an example of bibliographic information according to the second embodiment;

FIG. 32 is a diagram showing an example of a bibliographic information table according to the second embodiment; and FIG. 33 is a diagram showing an example of a bibliographic information list according to the second embodiment.

DESCRIPTION OF THE EMBODIMENTS

First Embodiment

Hereinafter, a pull printing system of an embodiment for carrying out the present invention will be explained with reference to the attached drawings.

Figure 1:
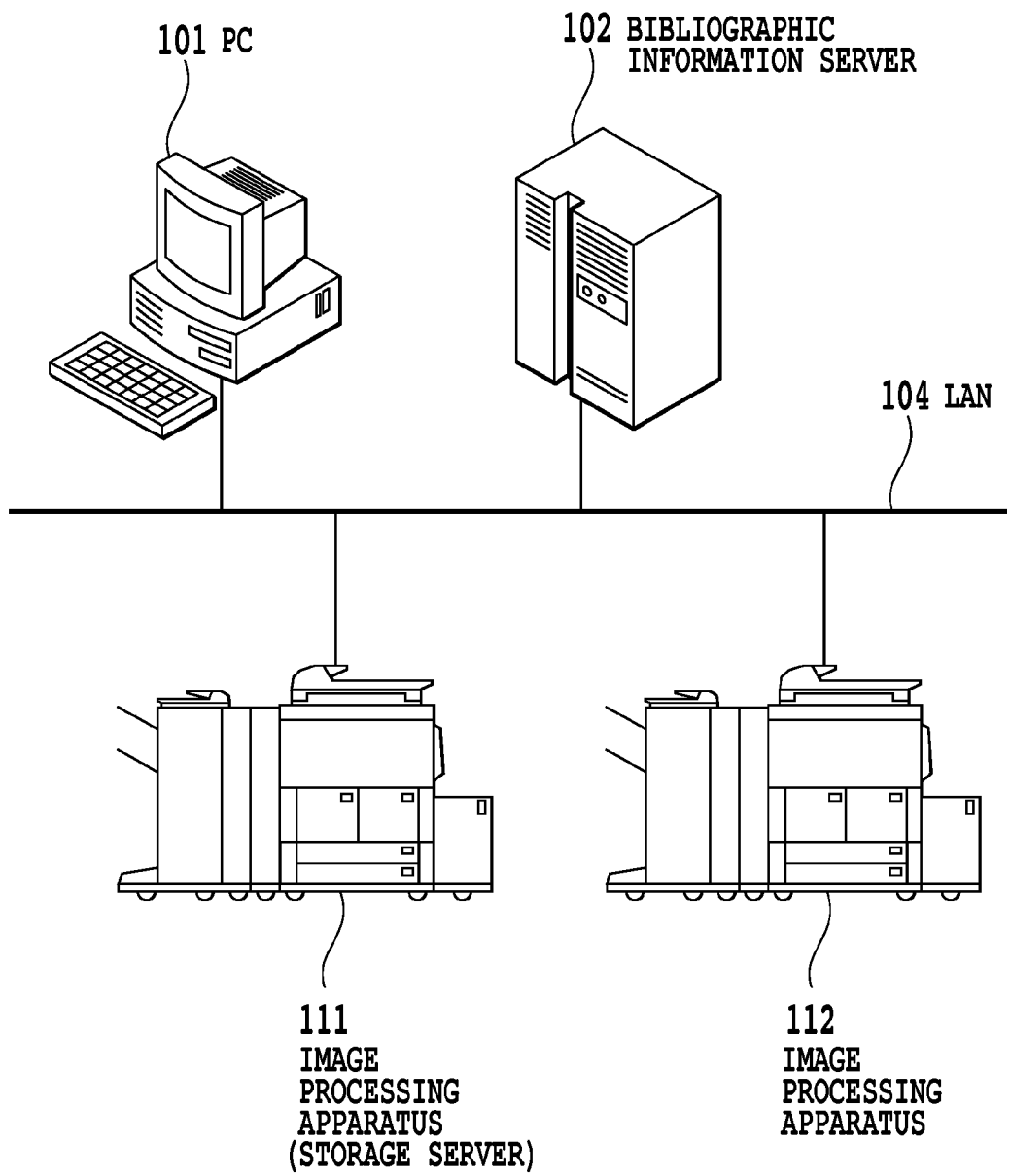
FIG. 1 is a diagram showing an arrangement of an example of a pull printing system according to the present invention.

FIG. 1 is a diagram showing an example of an arrangement of a pull printing system in which a PC, a server and an image processing apparatus are connected through a network.

In FIG. 1, reference numeral 101 is a PC as a client generating print data and reference numeral 102 is a bibliographic information server unifying bibliographic information of the print data. Reference numeral 111 and 112 are image processing apparatuses for outputting the print data, each of which is also provided with a function of an alternate process to be described later. Reference numeral 104 is a LAN acting as a network for mutually connecting the PC 101, the bibliographic information server 102 and the image processing apparatuses 111 and 112.

It should be noted that in the present arrangement example, the image processing apparatus 111 acts also as a storage server which receives print data from the PC 101, and registers and retains the received print data. It goes without saying that an independent storage server may be provided separately from the image processing apparatus. Further, the image processing apparatus 111 or the image processing apparatus 112 may be configured to act also as the aforementioned bibliographic information server 102.

In addition, in the present embodiment, the PC 101 and the image processing apparatuses 111 and 112 are connected through the LAN 104, but the PC and the image processing apparatus may be connected by a parallel cable, a serial cable, a USB cable or the like. In addition, an example of a device used for network connection is also not limited to the LAN and may use another network such as the Internet.

Figure 2:
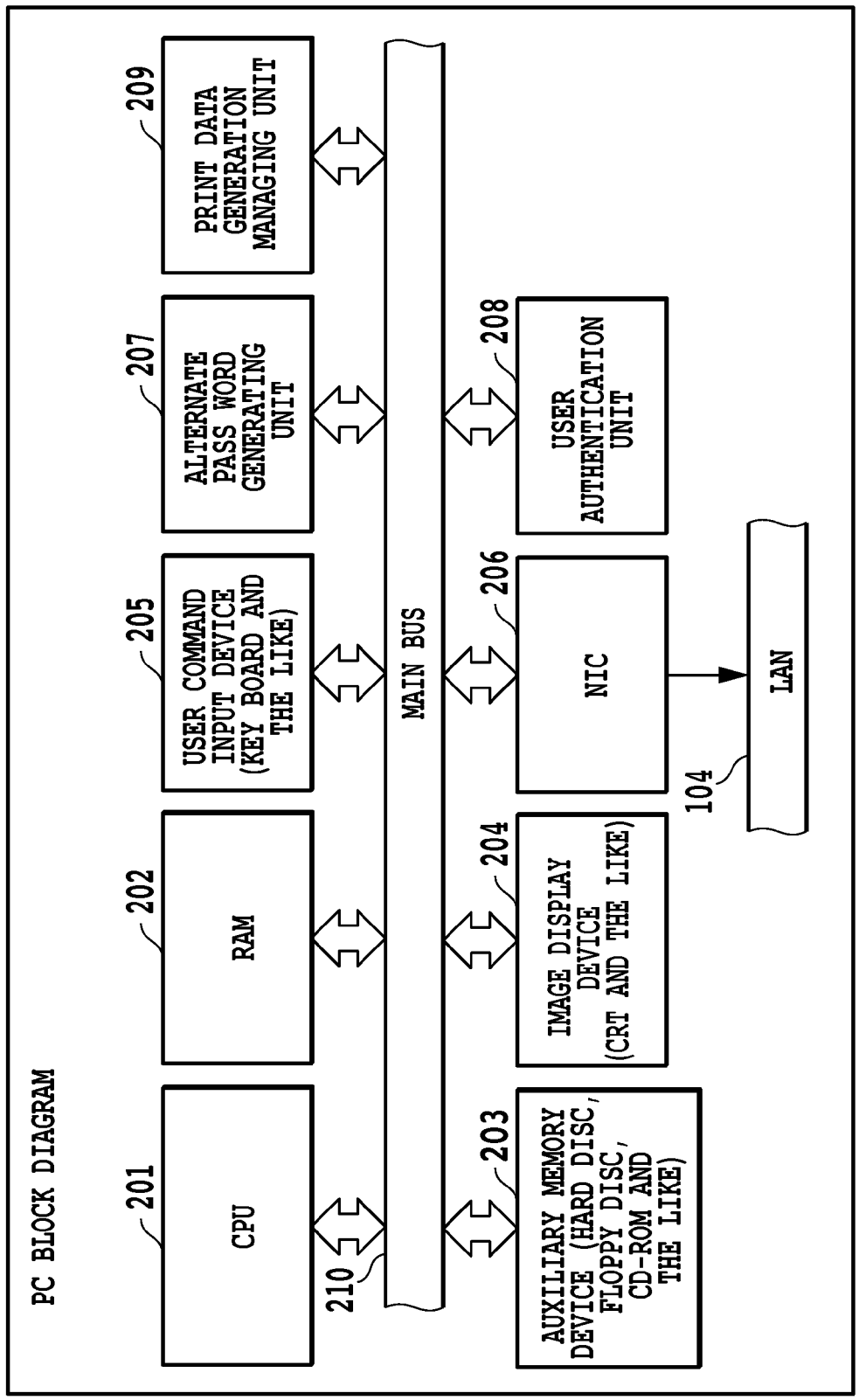
FIG. 2 is a diagram showing an example of an internal arrangement of a personal computer (PC)

FIG. 2 is a diagram showing an example of an internal arrangement of the PC in the present embodiment.

Reference numeral 201 is a CPU for executing an information process at the time of controlling various processes, reference numeral 202 is a RAM providing a work area of the CPU 201 and reference numeral 203 is an auxiliary memory device (hard disc, floppy (registered trademark) disc, CD-ROM or the like) providing control programs.

Reference numeral 204 is an image display device (specially CRT display, liquid crystal display or the like) used for notifying a user of a message or the like.

Reference numeral 205 is a user command input device (specially mouse, keyboard or the like) for inputting commands of users.

Reference numeral 206 is a network interface card (NIC) for mutually exchanging data with other network devices through the LAN 104. Print data are transmitted to the image processing apparatus through the NIC 206.

Reference numeral 207 is an alternate password generating unit for performing generation of an alternate password which an alternate user (user for executing an alternate process) uses at a login authentication time for an alternate process. The alternate password is generated based upon information which a user inputs with a user interface using the image display device 204. The generated alternate password is transmitted to a bibliographic information server for management.

Reference numeral 208 is a user authentication unit for performing login authentication of a user. A data base (DB) for user authentication may be provided in the PC or a separate authentication server for the DB may be provided. A well known method may be applied for the user authentication and the detailed explanation is omitted. The authenticated user is uniquely identified by the user ID.

Reference numeral 209 is a print data generation managing unit for performing generation and management of print data. User identification information (user ID) is applied to the print data. The generated print data are transmitted to a storage server for registration and management.

Reference numeral 210 is a main bus.

It should be noted that a function carried by each unit of 207 to 209 as described above can be realized by a software process and therefore may be omitted as a hardware structure.

Figure 3:
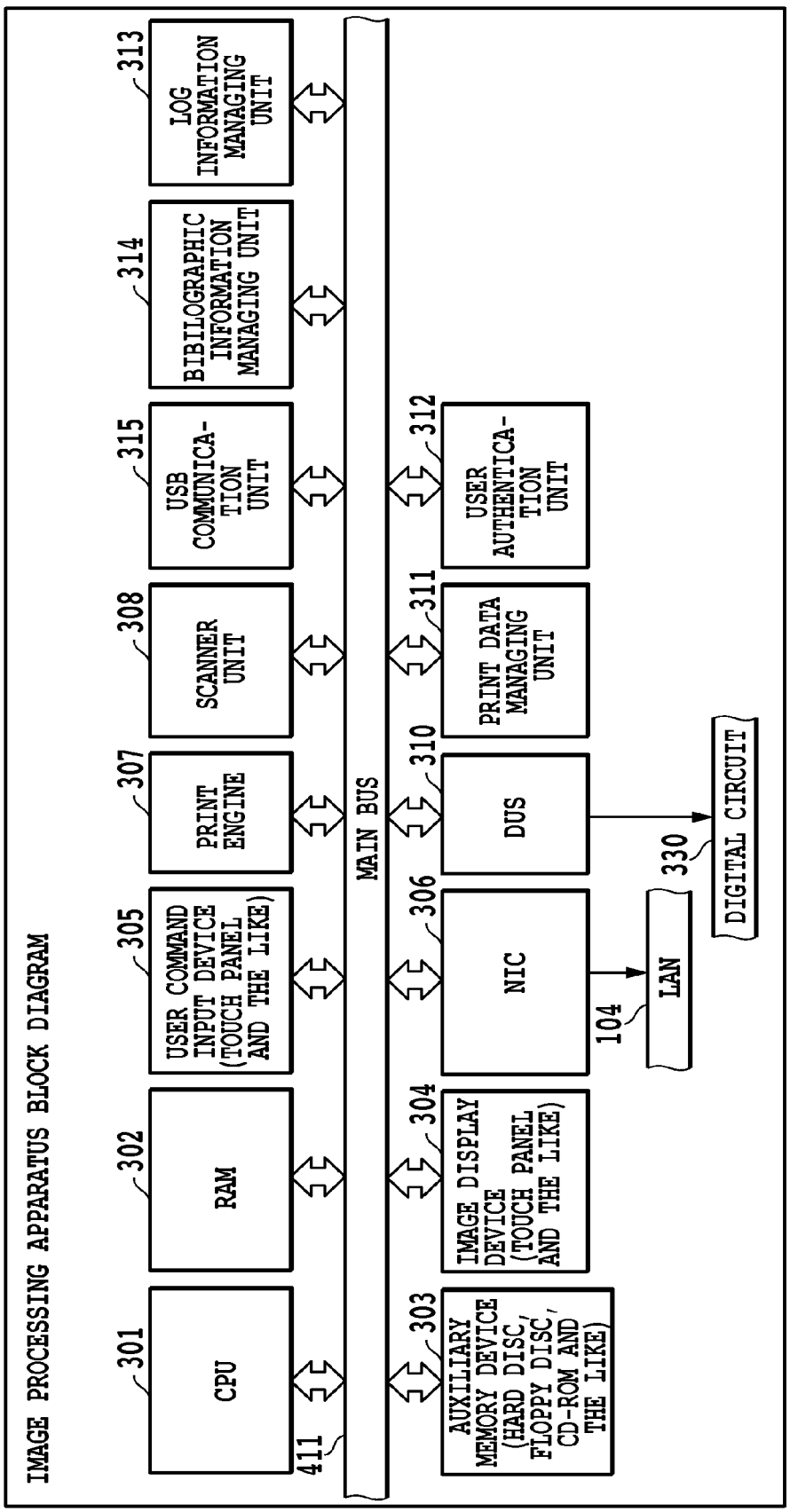
FIG. 3 is a diagram showing an outline of an internal arrangement of an image processing apparatus.

FIG. 3 is a diagram showing an outline of an internal arrangement of the image processing apparatus in the present embodiment.

Reference numeral 301 is a CPU for executing an information process at the time of controlling various processes, and reference numeral 302 is a RAM for performing provision of a work area of the CPU 301 and temporary storage of data.

Reference numeral 303 is an auxiliary memory device (hard disc, CD-ROM, or the like) used for temporary storage or in place of the RAM 302. In a case of acting also as the storage server, print data received from the PC are stored in the auxiliary memory device.

Reference numeral 304 is an image display device such as a touch panel, which can be used in a case of displaying a state of a printing device, an error message and the like. Reference numeral 305 is a user command input device (touch panel or the like), which is used for a user to carry out input of login information, an instruction of a desired print data and the like. The devices 304 and 305 may be configured as a single module such as a touch panel.

Reference numeral 306 is a NIC for interactively exchanging data with other network devices through the LAN 109.

Reference numeral 307 is a print engine for outputting print data inputted from the PC 101, the storage server or the like on a sheet.

Reference numeral 308 is a scanner unit to read a paper manuscript put on a manuscript base for generating electronic data of a black-and-white binary or a color multi-value, and the like.

Reference numeral 310 is a DSU (Digital Service Unit: digital circuit terminal device) connected to a digital circuit 330 and used for data transmission/reception.

Reference numeral 311 is a print data managing unit for executing general processes in regard to print data, such as analysis or management of storage for the print data. Specially the print data managing unit 311 performs storage and delete of the print data to and from the auxiliary memory device 303, extraction of user ID contained the print data, extraction of a print data storage location from bibliographic information, acquirement of the print data from the storage server, transfer of the print data to the storage server and the like.

Reference numeral 312 is a user authentication unit for confirming authority of a user for login. The user authentication unit 312 performs confirmation of user authority at a usual login time and confirmation of user authority for an alternate process. It should be noted that the present embodiment is configured such that the bibliographic information server is provided with the authentication DB to perform an actual authentication operation and the user authentication unit 312 determines the authority of a user based upon the authentication result. However, the authentication DB may be provided in the image processing apparatus which performs also the actual authentication operation.

Reference numeral 313 is a log information managing unit for acquiring a log of an operation history during an alternate process. Specially in regard to information on an alternate user of which user authority of an alternate process is confirmed executes which process to what print data, the log information managing unit 313 acquires the user ID of the alternate user and the log. The acquired log is transmitted to the bibliographic information server, which will be described later, for registration and management. In addition, the log information managing unit 313 notifies (warns) a user who will execute an alternate process from now on of the fact that the log is supposed to be acquired. Further, the log information managing unit 313 performs also notification (report) about the log information as described above, at a usual login time by the user. These notifications are performed by being displayed on the image display device 304.

Reference numeral 314 is a bibliographic information managing unit for executing a general process in regard to bibliographic information. The bibliographic information managing unit 314 requests the bibliographic information server for bibliographic information of a particular user for acquirement.

Besides, in a case of the image processing apparatus acting also as the storage server, the bibliographic information managing unit 314 executes a process for generating the bibliographic information based upon the print data received from the PC. Specially the bibliographic information managing unit 314 extracts user ID, a storage location, a name of the print data (file name) and the like from the received print data to produce the bibliographic information. FIG. 6 is an example of the bibliographic information. The bibliographic information 600 contains a print data name 601, a storage location 602 and user ID 603. It goes without saying that the content constituting the bibliographic information is not limited to these items, but may further contain registration date and time of the print data, a thumbnail image of the print data and the like. It should be noted that the bibliographic information server is specified by server registration information (for example, IP address) stored and managed separately in the auxiliary memory unit 303. FIG. 5 is an example of the server registration information where an IP address [192. 168. 10. 1] is registered as information specifying the bibliographic information server.

Reference numeral 315 is a USB communication unit for exchanging data with an external information terminal using a USB.

Reference numeral 316 is a main bus.

It should be noted that a function carried out by each unit of 311 to 314 described above can be realized by a software process and therefore may be omitted as a hardware structure.

Figure 4:
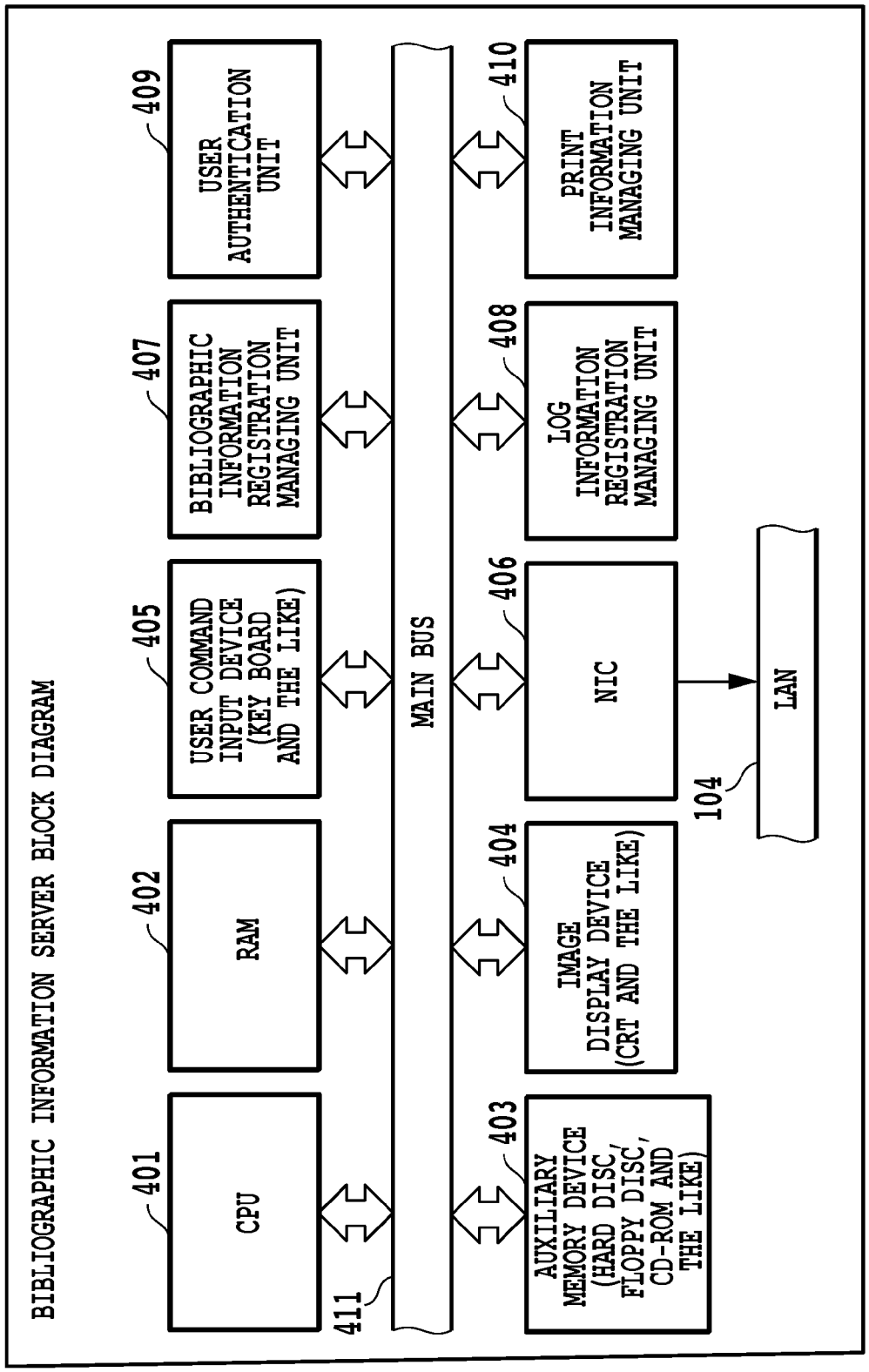
FIG. 4 is a diagram showing an example of an internal arrangement of a bibliographic information server.

FIG. 4 is a diagram showing an example of an internal arrangement in the bibliographic information server according to the present embodiment.

Reference numeral 401 is a CPU for executing an information process at the time of controlling various processes, reference numeral 402 is a RAM for providing a work area of the CPU 401 and reference numeral 403 is an auxiliary memory device (hard disc, floppy (registered trademark) disc, CD-ROM or the like) for providing control programs.

Reference numeral 404 is an image display device (specially CRT display, liquid crystal display or the like) used for notifying a user of a message or the like.

Reference numeral 405 is a user command input device (specially mouse, keyboard or the like) for inputting commands of users.

Reference numeral 406 is a network interface card (NIC) for mutually exchanging data with other network devices through the LAN 104.

Reference numeral 407 is a bibliographic information managing unit for performing registration and provision of bibliographic information. The bibliographic information managing unit 407 applies specific bibliographic information ID to each piece of the bibliographic information received from the storage server, and registers and stores the bibliographic information in the bibliographic information table. The bibliographic information table is stored in the auxiliary memory unit 403. FIG. 7 is an example of the bibliographic information table, which shows a state where in a bibliographic information table 700, bibliographic information ID is applied to each print data to manage the bibliographic information. In addition, the bibliographic information managing unit 407 receives a request from the image processing apparatus to provide a bibliographic information list of the designated user ID to the image processing apparatus. FIG. 8 is an example of the bibliographic information list, which shows an example of extracting only the bibliographic information in which the user ID corresponds to "kaneko", from the bibliographic information table 700. Besides, the bibliographic information managing unit 407 performs also delete of unnecessary bibliographic information or the like.

Reference numeral 408 is a log information registration managing unit for performing registration and management of a log of login authentication for an alternate process in the image processing apparatus and a log of an operation during the alternate process. The log during the alternate process is associated with the log received from the image processing apparatus and the user ID of the alternate user, which is stored in the log information table in the auxiliary memory unit 203. FIG. 10 is an example of the log information table during the alternate process. A log information table 1000 contains log information on, for example, about which user ID and when, who (which user ID) logs in to the image processing apparatus using an alternate password, and performs what operation. For example, number 1001 shows an event that a user of which the user ID corresponds to "tanaka" uses an alternate password to log in to the print data of the user ID "tanaka"] "at 14:30 on tenth day of June, 2008". Numbers 1002 and 1003 show an event that the user "tanaka" subsequently previews and prints the print data of the bibliographic information ID "02011". Number 1004 shows an event that the user "tanaka" previews the print data of the bibliographic information ID "02014".

Reference numeral 409 is a user authentication unit for executing a process in regard to authentication of a user. The user authentication unit 409 uses a user authentication data base (DB) (not shown) to execute an authentication process of a user for logging in to the image processing apparatus. The authentication is made such that the user authentication unit 909 receives user ID and a password inputted to the image display device 304 in the image processing apparatus from the image processing apparatus to check them with the password managing table (not shown) for determining the match. In a case of the login authentication for the alternate process, the user authentication unit 409 receives alternated user ID and an alternate password from the image processing apparatus and checks them with a password managing table separately existing, for making the similar determination. Further, in the present embodiment, registration of the alternate password and the management thereof are also performed. Specially the alternate password notified by a client PC and the user ID are associated, which are registered and stored in the alternate password managing table. The alternate password managing table is stored in the auxiliary memory device 203. FIG. 9 is an example of the alternate password managing table. In the alternate password managing table 900, number 901 shows an event that the alternate password which can access the print data in which the user ID corresponds to "kaneko" is "Zzddioa93s33". This alternate password "Zzddioa93s33" is set in the PC by the user "kaneko". Similarly number 902 shows an event that the alternate password which can access the print data in which the user ID corresponds to "tanaka" is "dfdIffekks933". It should be noted that it is preferable that the alternate password is encrypted for storage.

Reference numeral 410 is a print information managing unit which manages information in regard to print data of which a print is performed in the image processing apparatus. A print information table (not shown) is used for the management of the information.

Reference numeral 411 is a main bus.

It should be noted that a function carried by each unit of 407 to 410 as described above can be realized by a software process and therefore may be omitted as a hardware structure.
(Alternate Password Registering Process)

Figure 11:
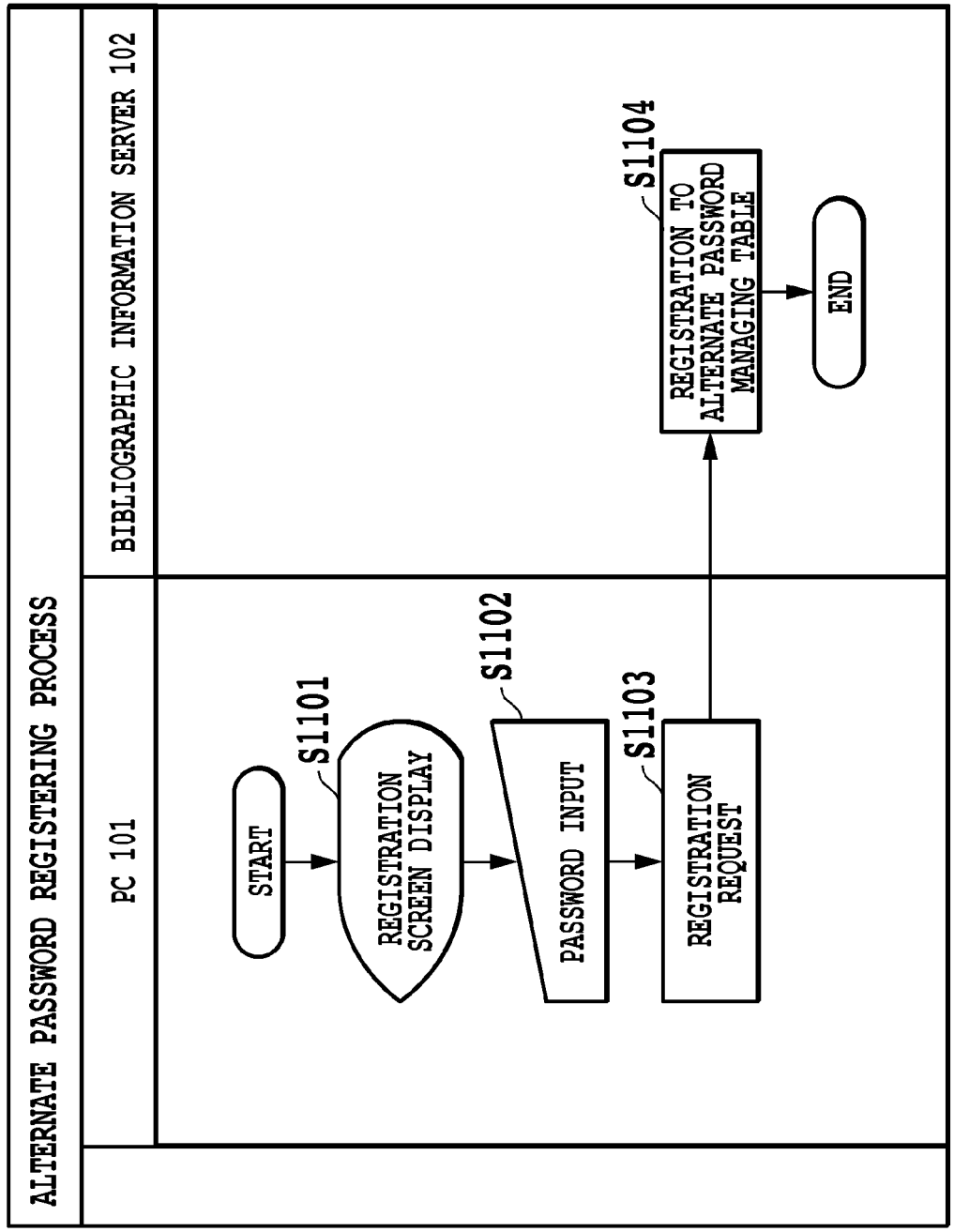
FIG. 11 is a flowchart showing a registering process of an alternate password.

FIG. 11 is flow chart expressing a registering process of an alternate password, which is executed on the PC 101 by a second user as an alternated user. Hereinafter, a process of registering the alternate password along this flow chart will be explained.

Step 1101 to step 1103 are processes executed by the alternate password generating unit 207 in the PC 101. In addition, step 1104 is a process executed by the user authentication unit in the bibliographic information server 102.

Figure 12:
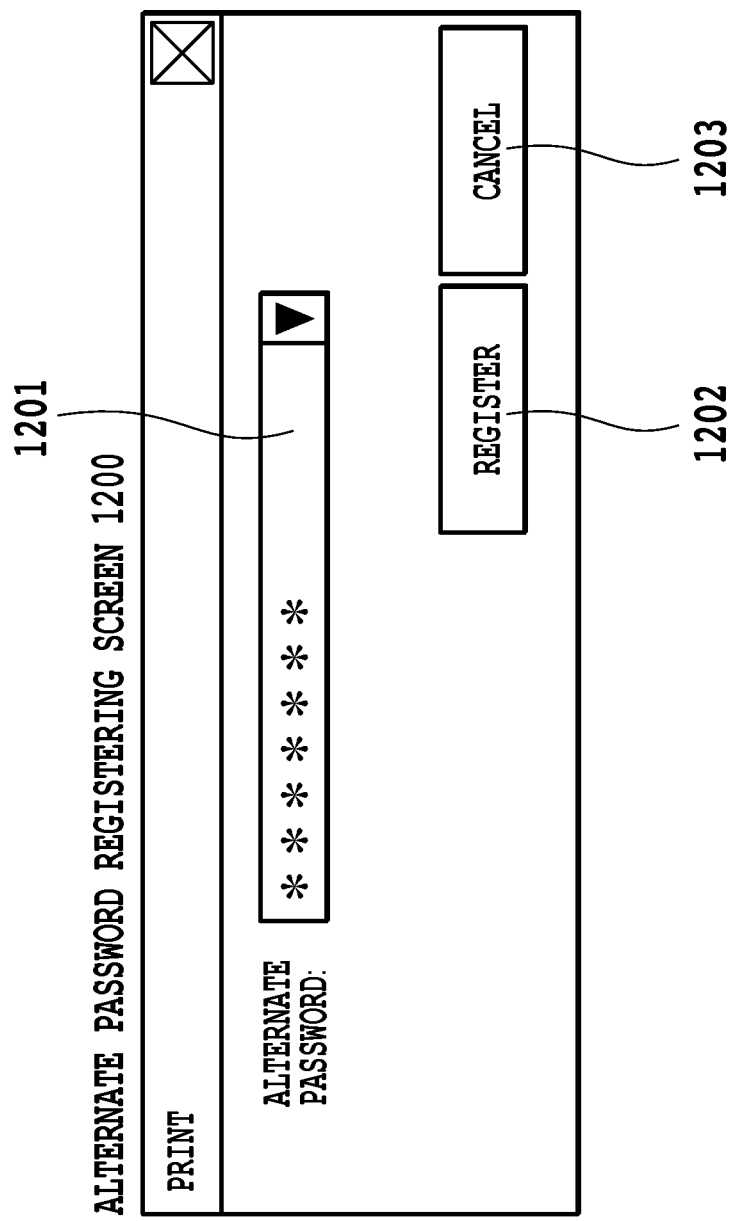
FIG. 12 is a diagram showing a registering screen of an alternate password.

First, at step 1101 the alternate password generating unit 207 displays an alternate password registration screen for a user to register an alternate password, on the image display device 204. FIG. 12 is an example of the alternate password registration screen. Reference numeral 1201 in the password registration screen 1200 is an alternate password input area, reference numeral 1202 is a registration button and reference numeral 1203 is a cancellation button. At step 1102 a user inputs an alternate password composed of any character line, any figure or the like in the alternate password registration area 1201.

When the registration button 1202 is pushed down after inputted, at step 1103 the alternate password generating unit 207 transmits user ID of a user who is logging in to the PC 101 at this point and the inputted alternate password to the bibliographic information server 102 and makes a registration request of the alternate password thereto.

In the bibliographic information server 102 which receives the user ID and the inputted password and receives the registration request of the alternate password, the user authentication unit 409 associates the user ID with the alternate password, which are registered in the alternate password managing table (step 1104).

It should be noted that here, there is explained an example of making the registration request of the alternate password directly to the bibliographic information from the PC 101, but the registration request may be made through the image processing apparatus. That is, the registration request of the alternate password is once made from the PC to the image processing apparatus, and the image processing apparatus which has received this registration request transfers the registration request from the PC to the server, whereby the registration process of the alternate password may be executed.
(Print Data Registering Process)

Figure 13:
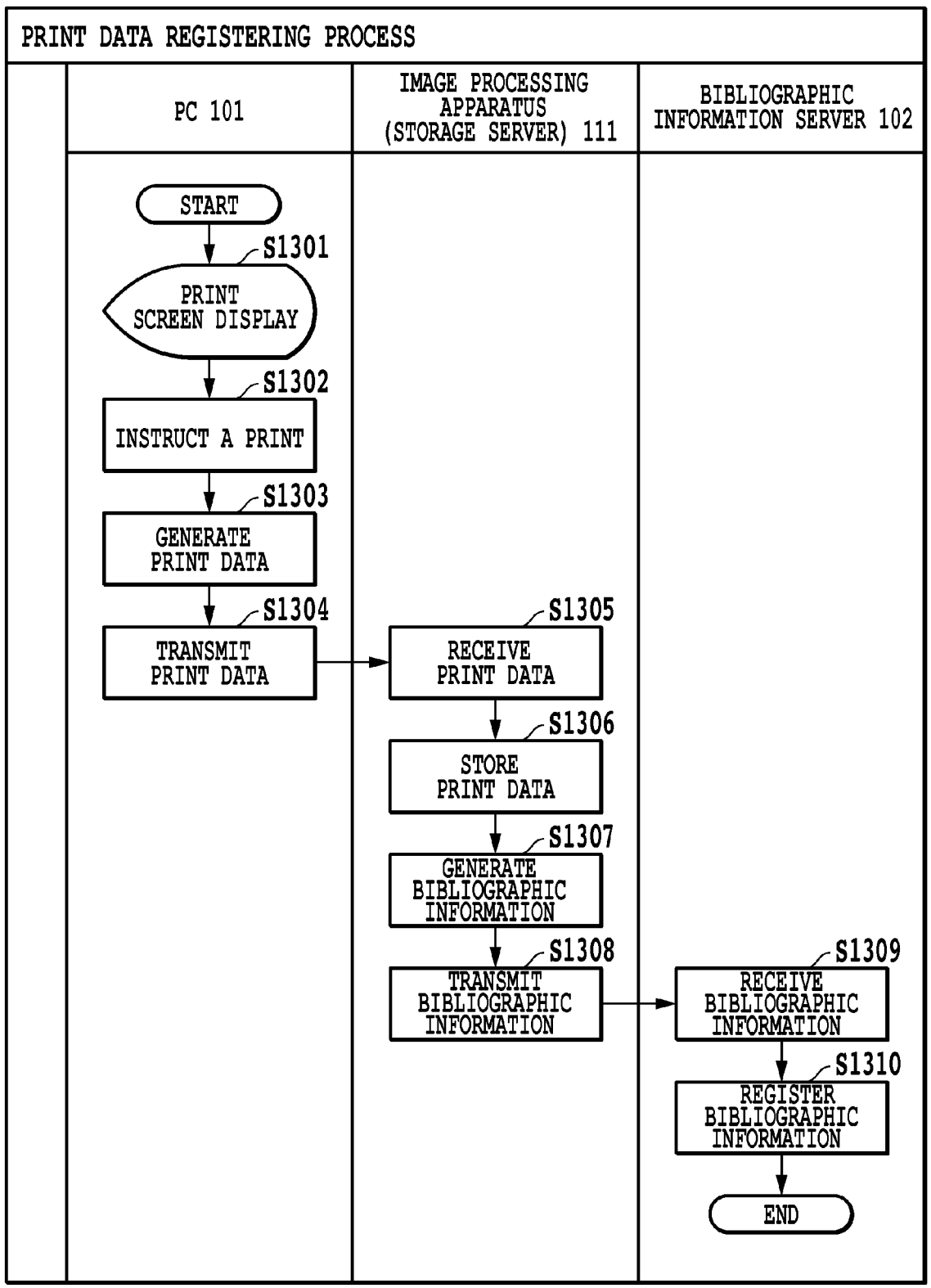
FIG. 13 is a flow chart showing a process of registering (storing) print data.

FIG. 13 is a flow chart showing a process in which a user uses an application on the PC 101 to register (store) print data in the image processing apparatus 111 as the storage server. Hereinafter, there will be explained a process of registering the print data along this flow chart.

Step 1301 to step 1304 are executed by the print data generation managing unit 209 in the PC 101. In addition, step 1305 to step 1308 are executed by the print data managing unit 311 and the bibliographic information managing unit 314 in the image processing apparatus 111. Further, step 1309 and step 1310 are executed by the bibliographic information registration managing unit 407 in the bibliographic information server 102.

Figure 14:
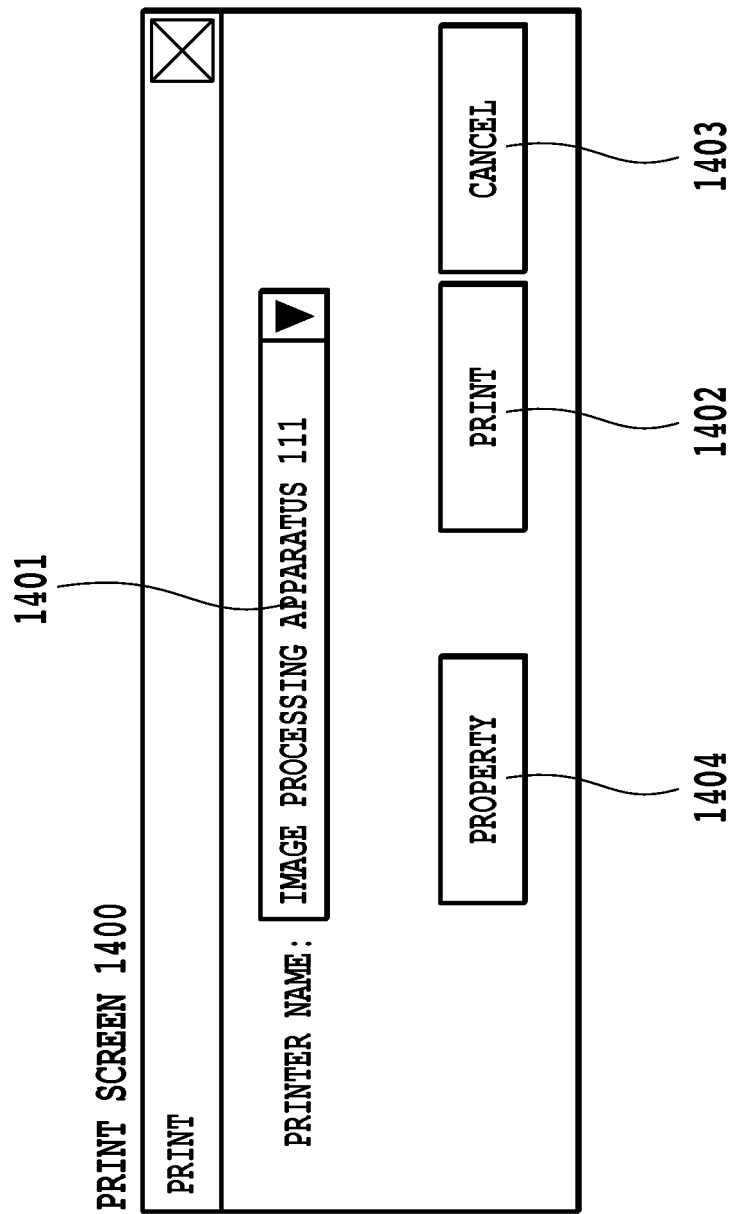
FIG. 14 is a diagram showing an example of a print screen.

When a user executes a printing process from any application on the PC 101, at step 1301 the print data generation managing unit 209 displays a print screen in the image display device 204. FIG. 14 is an example of the print screen. Reference numeral 1401 in a print screen 1400 is a transmission destination printer designation area, reference numeral 1402 is a print button, reference numeral 1403 is cancellation button and reference numeral 1404 is a detail setting property button. At step 1302, when a user designates any image processing apparatus (here, image processing apparatus 111) and pushes down the print button 1402, the print data generation managing unit 209 first acquires user ID of a user which is logging in to the PC 101 at this time.

Next, at step 1303 the print data generation managing unit 209 generates print data to be transmitted to the image processing apparatus 111. That is, the print data generation managing unit 209 generates the print data made by applying the user ID acquired at step 1302 to the data generated by the application.

At step 1304 the print data generation managing unit 209 transmits the generated print data to the image processing apparatus 111.

The print data managing unit 311 in the image processing apparatus 111 receives the print data (step 1305) and stores the received print data in the auxiliary memory device 303 (step 1306).

In addition, at step 1307 the bibliographic information managing unit 314 extracts the user ID from the print data to generate bibliographic information as shown in FIG. 6.

At step 1308 the bibliographic information managing unit 314 transmits the generated bibliographic information to the bibliographic information server 102 to instruct registration of the bibliographic information.

When the bibliographic information registration managing unit 407 in the bibliographic information server 102 receives the bibliographic information and accepts the registration instruction (step 1309), the bibliographic information is registered (or newly produced) in the bibliographic information table as shown in FIG. 7 and is stored in the auxiliary memory device 203 (step 1310).

(Process at Login)

Figure 15B:
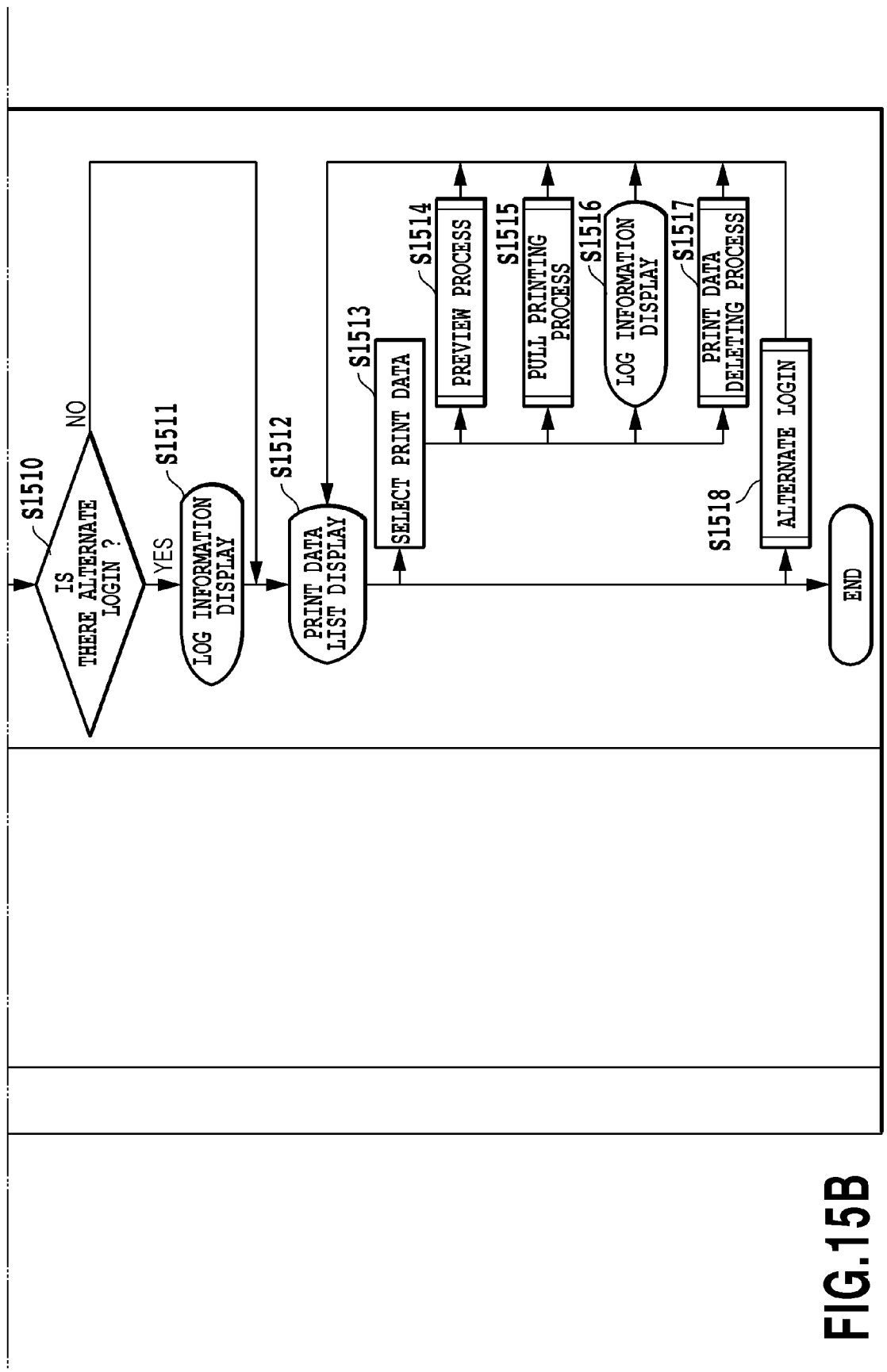

FIGS. 15A and 15B are flow chart explaining a series of processes when a user logs in to the image processing apparatus 112 for outputting the print data registered in the image processing apparatus 111 as the storage server.

Here, step 1503 and step 1506 to step 1508 are executed by the bibliographic information registration managing unit 407, the log information registration managing unit 408 and the user authentication unit 409 in the bibliographic information server 102. In addition, steps 1501, 1502, 1504, 1505 and steps 1509 to 1518 are executed by the print data managing unit 311, the user authentication unit 312, the log information managing unit 313 and the bibliographic information managing unit 319 in the image processing apparatus 112.

Figure 16:
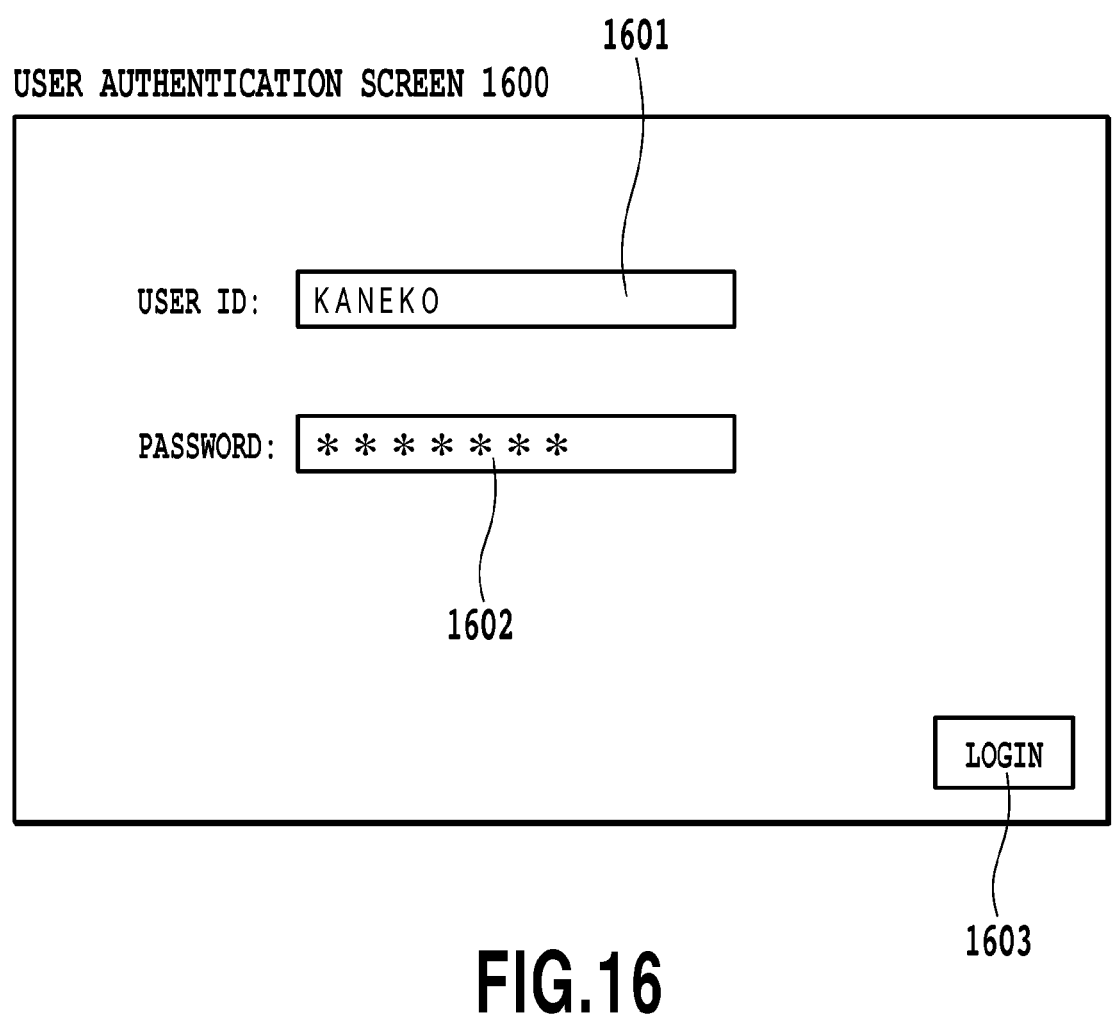
FIG. 16 is a diagram showing an example of a user authentication screen.

First, at step 1501 the user authentication unit 312 in the image processing apparatus 112 displays a user authentication screen for a user to log in, on the image display device 304. FIG. 16 is an example of the user authentication screen. Reference numeral 1601 is a user ID input area, reference numeral 1602 is a password input area and reference numeral 1603 is a login button. When the user inputs its own user ID (in this case, "kaneko") in the user ID input area 1601, subsequently inputs a password in the password input area 1602 and pushes down the login button 1603, the process goes to step 1502.

At step 1502 the user authentication unit 312 transmits the inputted user ID and password to the bibliographic information server 102 to make a request of a login authentication of the user.

When the bibliographic information server 102 receives the user ID and the password, the following process is executed. That is, at step 1503 the user authentication unit 909 reads out the password managing table in the user authentication DB and checks it with the received user ID and password for determining the match. When it is matched, the determination of "OK" is made and when it is not matched, the determination of "NG" is made. The user authentication unit 409 notifies the image processing apparatus 112 of the authentication result.

At step 1504 the user authentication unit 312 in the image processing apparatus 112 confirms whether or not the user owns the login authority based upon the authentication result notified from the bibliographic information server 102. That is, if the authentication result is "OK", the login of the user of the inputted user ID is permitted and the process goes to step 1505. If the authentication result is "NG", an event that the login authentication has failed is displayed on the image display device 304 to be notified to the user, and the process goes back to step 1501.

Next, at step 1505 the bibliographic information managing unit 314 notifies the bibliographic information server 102 of the user ID of the user whose login is permitted and requests the bibliographic information list and the log information list in regard to the user ID.

In the bibliographic information server 102 which has received the request of the bibliographic information list, at step 1506 the bibliographic information registration managing unit 407 extracts the bibliographic information corresponding to the notified user ID from the bibliographic information table and generates the bibliographic information list. Further, at step 1507 the log information registration managing unit 408 refers to the log information table to generate the log information list corresponding to the notified user ID. FIG. 17 is an example of the log information list. Here, FIG. 17 shows an example of a log information list of extracting only log information in which the user ID corresponds to "kaneko", from the log information table 1000 shown in FIG. 10 described before.

At step 1508 the bibliographic information registration managing unit 907 and the log information registration managing unit 408 transmit the generated bibliographic information list and log information list to the image processing apparatus 112.

At step 1509 the bibliographic information managing unit 314 and the log information managing unit 313 in the image processing apparatus 112 acquire the bibliographic information list and the log information list from the bibliographic information server 102. At step 1510 the log information managing unit 313 in the image processing apparatus 112 refers to the log information list to determine whether or not there exists the log showing that the login authentication for the alternate process by the first user is made. In a case where it is determined that there exists the log showing that the login authentication for the alternate process is made, the process goes to step 1511. In a case where it is determined that there does not exist the log showing that the login authentication for the alternate process is made, the process goes to step 1512.

Figure 18:
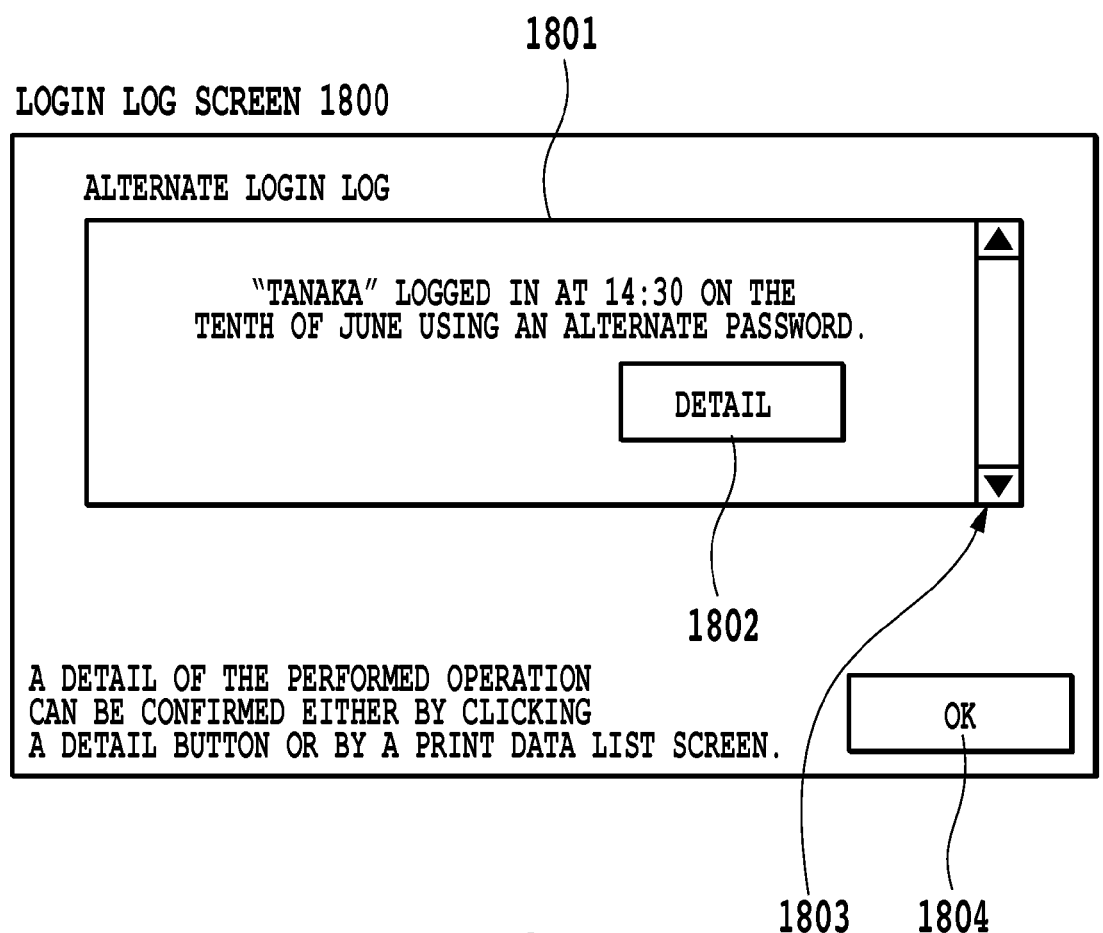
FIG. 18 is a diagram showing an example of a login log screen.

At step 1511 the log information managing unit 313 displays a login log screen in the image display device 304, thereby to notify the second user during login of the fact that the first user has logged in using the alternate password. FIG. 18 is an example of the login log screen. Reference numeral 1801 on the login log screen 1800 is a log display area, which displays information showing an event that "by which user ID", "when" the login is made using the alternate password. It should be noted that FIG. 18 is an example in a case where the login is permitted, but in a case where the history that the login has failed remains, the fact is displayed similarly. Reference numeral 1802 is a detail button. When the button 1802 is pushed down, the login log screen moves to a detail screen showing a detail of an operation which is performed at the login using the alternate password. Reference numeral 1803 is a slide bar on the log display area. In a case of many pieces of log information in regard to the event that the login is made using the alternate password, the slide bar 1803 scrolls the screen, making it possible to display these pieces of the log information. Reference numeral 1804 is an OK button. When a user pushes down the OK button 1804, the display of the login log screen 1800 ends.

Figure 19:
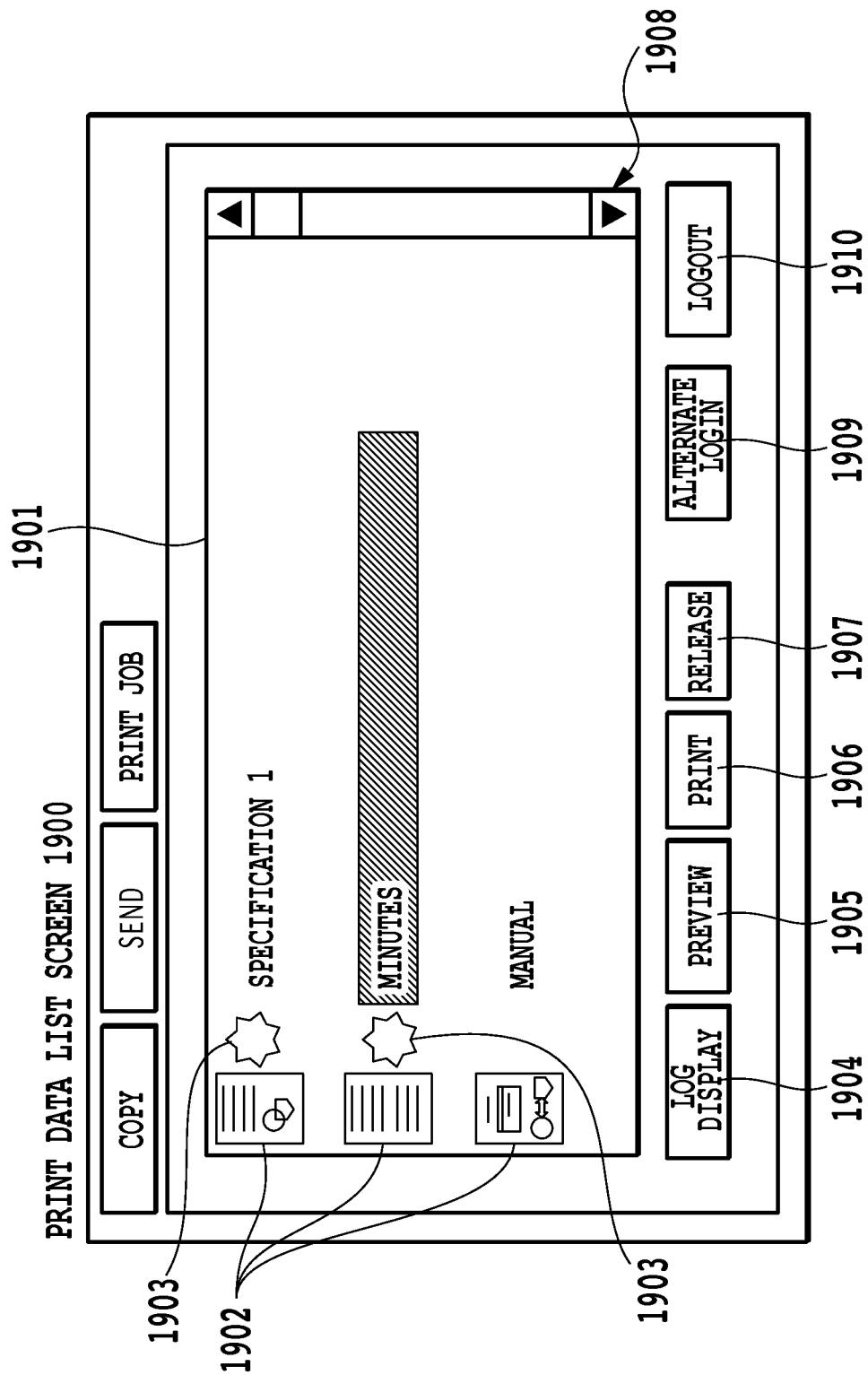
FIG. 19 is a diagram showing an example of a screen displaying a list of print data.

At step 1512 the print data managing unit 311 displays a list of print data existing in the bibliographic information list acquired from the bibliographic information server 102. FIG. 19 is an example of a screen showing a list of the print data. Reference numeral 1901 of the print data list screen 1900 is a print data list display area which displays a list of the print data contained in the acquired bibliographic information list. A user can select any print data from the print data list and the selected data has a portion of the print data name which is highlighted. In this example, the print data of a print data name "minutes" is selected, which is shown to be highlighted. Reference numeral 1902 is a thumbnail image of each print data. The thumbnail image may use the data in advance contained in the bibliographic information or may be acquired by requesting a storage location (storage server) contained in the bibliographic information. Reference numeral 1903 is a mark showing that an alternate user who has logged in using an alternate password accesses the print data. That is, the mark is displayed in a case where a log which prints or previews a specific print data exists in the acquired log information list. Reference numeral 1904 is a log display button. When this button is pushed down, the display screen transfers to an alternate operation log screen of the selected print data in the print data list. The alternate operation log screen will be again described later. It should be noted that in a case where there is no log information in the selected print data, the log display button is grayed out, creating a state where the button can not be pushed down. Reference numeral 1905 is a preview button. When the preview button is pushed down, a detail preview of the selected print data is displayed. Reference numeral 1906 is a print button. When the print button 1906 is pushed down, an output process of the selected print data is executed. Reference numeral 1907 is a delete button. When the delete button 1907 is pushed down, a deleting process of the selected print data is executed. Reference numeral 1908 is a slide bar of the print data list display area 1901. When a print data list to be displayed in the print data list display area 1901 can not be accommodated within a single screen, the scroll display is made possible. Reference numeral 1909 is an alternate login button. When the alternate login button 1909 is pushed down, the display screen transfers to an alternate login screen. Reference numeral 1910 is a logout button. When the logout button 1910 is pushed down, a logout process is executed to end the process at the login.

The print data managing unit 311 executes the process in response to each of the buttons 1904 to 1907 and 1909 pushed down after a user selects any of the print data (step 1513). In a case where the user selects the logout button 1910, the logout process is executed to end the present process.

(Preview Process)

Figure 21:
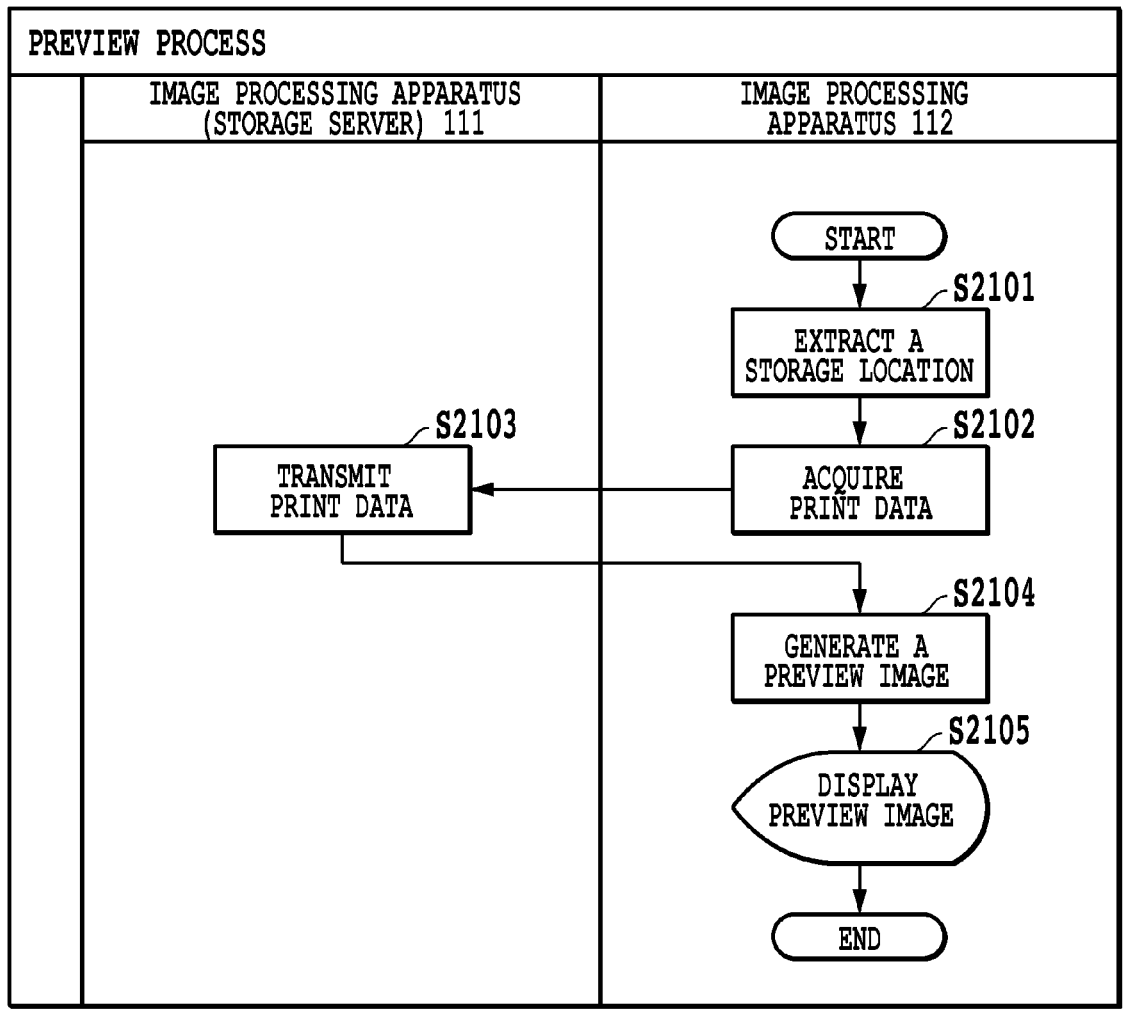
FIG. 21 is a flow chart showing a detail of a preview process.

When a user pushes down the preview button 1905, at step 1514 the preview display process is executed. By referring to a flowchart in FIG. 21, the preview process will be explained. It should be noted that steps 2101, 2102, 2104 and 2105 on the flow chart in FIG. 21 are executed in the image processing apparatus 112. Step 2103 is executed in the image processing apparatus 111 having a function of the storage server.

When the user selects a specific print data in the image processing apparatus 112 and makes a preview instruction thereof, the bibliographic information managing unit 314 refers to the bibliographic information list 800 to extract a storage location of the specific print data (step 2101). Here, the image processing apparatus 111 is the storage location.

At step 2102 the print data managing unit 311 notifies the image processing apparatus 111 of the bibliographic information ID of the specific print data and requests the specific print data.

In response to the request, the print data managing unit 311 in the image processing apparatus 111 transmits a print data corresponding to the notified bibliographic information ID to the image processing apparatus 112 (step 2103).

The image processing apparatus 112 which has acquired the print data generates a preview image (step 2104) and displays the generated preview image on the image display device 304 (step 2105).

Figure 22:
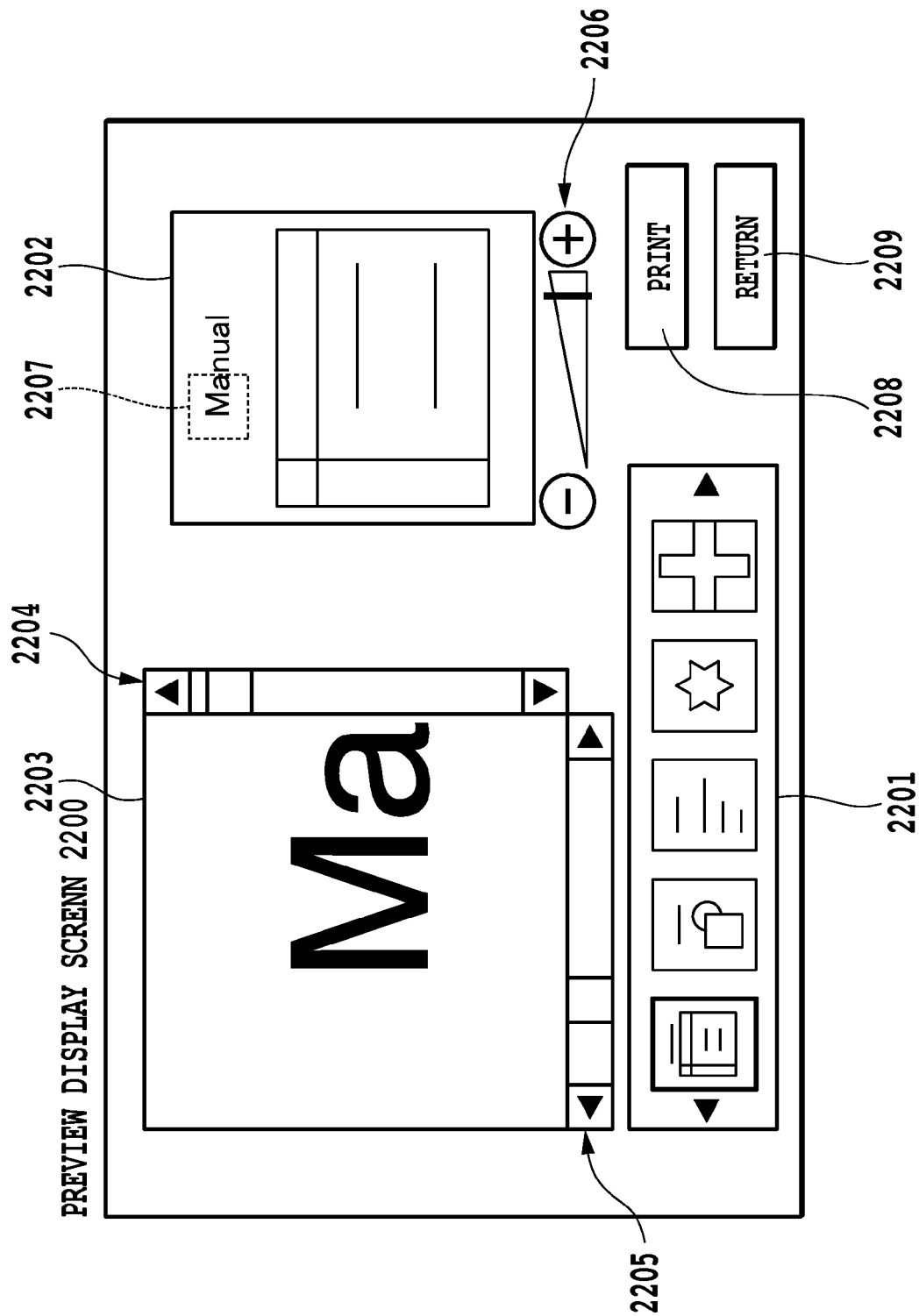
FIG. 22 is a diagram showing an example of a preview display screen.

FIG. 22 is an example of a preview display screen. Reference numeral 2201 in the preview display screen 2200 is a display area of a thumbnail image of each page and a user can select a page to be desired to display from this area. Reference numeral 2202 is an area for displaying an entirety of the page selected at the display area 2201. Reference numeral 2203 is an area for, at any expansion rate, displaying an area of any position on the page displayed in the area 2202, the display position of which is selected by a slide bar 2204 and a slide bar 2205 and an expansion rate of which is selected by a slide bar 2206. An area displayed on the area 2203 on the area 2202 is displayed on an area 2207. Reference numeral 2208 is a print button. When a user pushes down the print button 2208, an output (pull printing) process of the previewed print data is executed. Reference numeral 2209 is a return button. When the user pushes down the return button 2209, the preview display ends.

When the preview display process ends, the process goes back to step 1512.

(Pull Printing Process)

When a user selects a specific print data on the print data list screen 1900 displayed at step 1512 (step 1513) and subsequently pushes down the print button 1906, the pull printing process is executed at step 1515.

Figures 23, 23A, 23B:
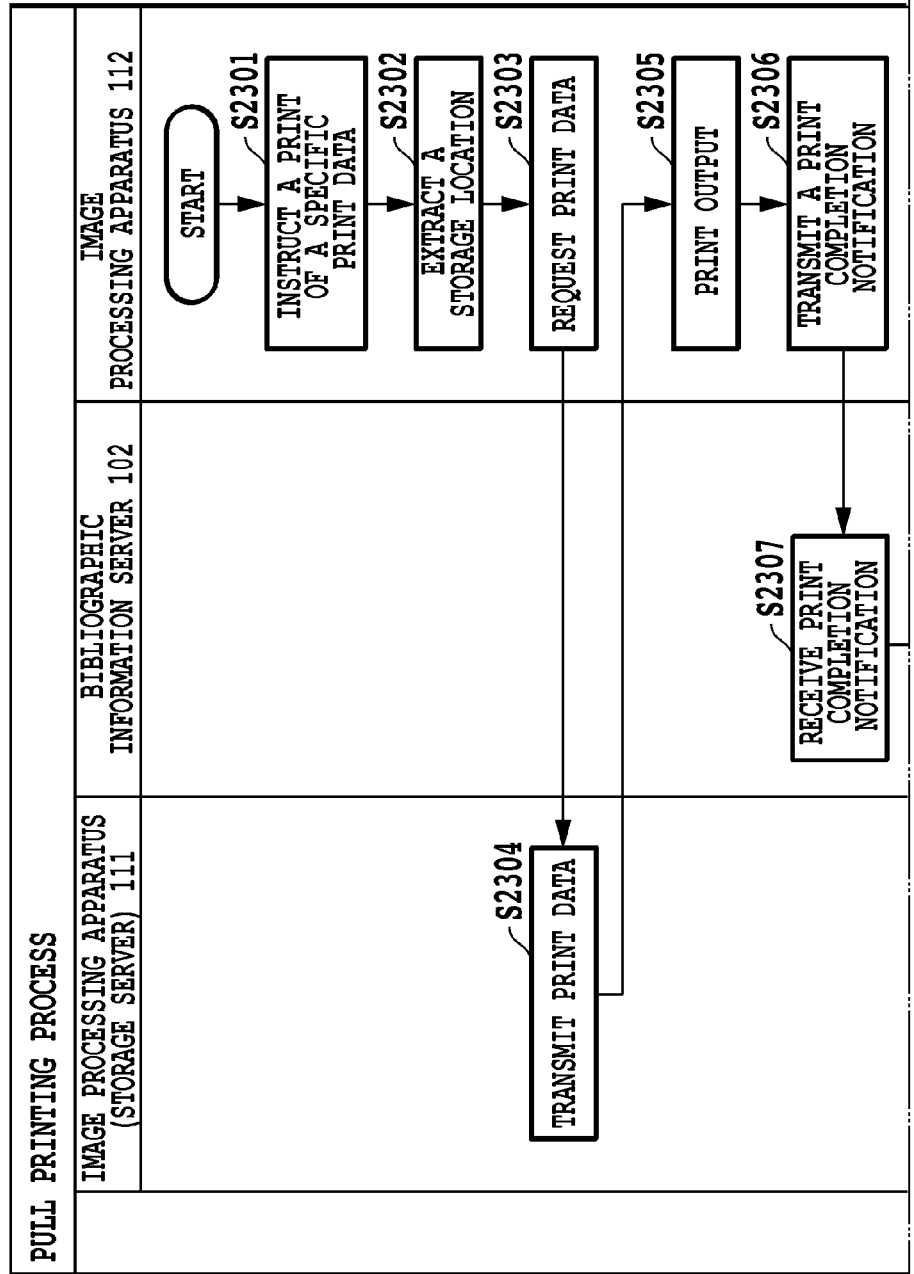
FIG. 23 is a flowchart showing the relationship of FIGS. 23A and 23B.
FIGS. 23A and 23B are flow chart showing a detail of a pull printing process.
Figure 23B:
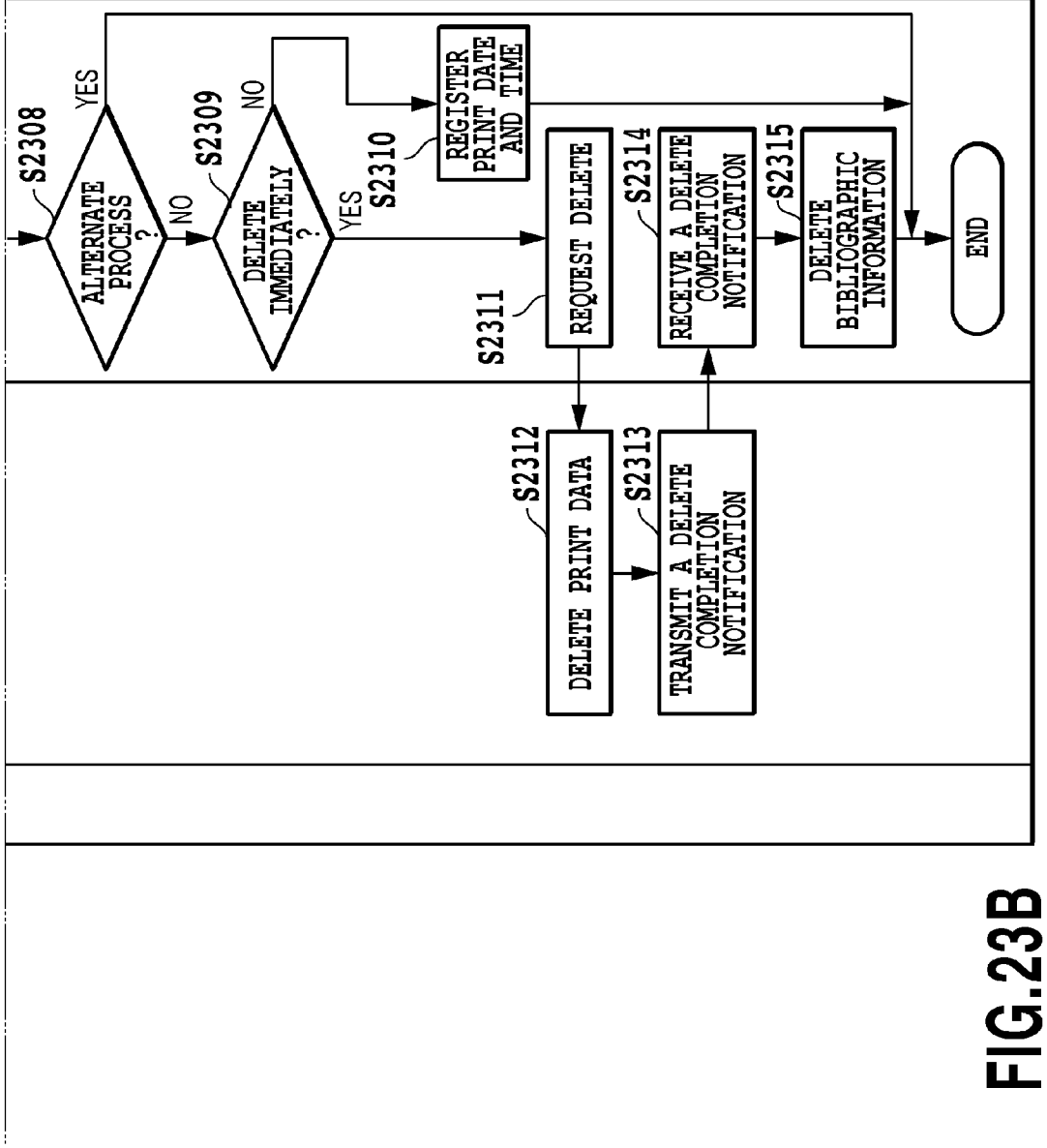

FIGS. 23A and 23B are flow chart showing a detail of the pull printing process. It should be noted that steps 2301 to 2303, 2305 and 2306 in FIG. 23A are executed in the image processing apparatus 112. In addition, steps 2304, 2312 and 2313 are executed in the image processing apparatus 111 having a function of the storage server. Steps 2307 to 2311, 2314 and 2315 are executed in the bibliographic information server 102.

First, at step 2301 a user uses the print data list screen 1900 in the image processing apparatus 112 to instruct a print of the specific print data (pushing down the print button 1906).

At step 2302 the print data managing unit 311 in the image processing apparatus 112 extracts information (IP address) showing a storage location of the specific print data from the bibliographic information list acquired at step 1509 in FIG.

152A to find out the storage location. Herein, the image processing apparatus 111 acting also as the storage server is the storage location.

At step 2303 the print data managing unit 311 in the image processing apparatus 112 notifies the image processing apparatus 111 of the storage location of the specific print data, that is, the bibliographic information ID of the specific print data and requests the print data.

In response to the request, the print data managing unit 311 in the image processing apparatus 111 transmits the print data corresponding to the notified bibliographic information ID to the image processing apparatus 112 (step 2304).

At step 2305 the image processing apparatus 112 uses a print engine 307 to perform print output of the acquired print data.

When the print output is completed, the print data managing unit 311 in the image processing apparatus 112 transmits to the bibliographic information server 102 a notification that the print is completed, together with the bibliographic information ID of the print data and the user ID during login at present (step 2306).

When the bibliographic information server 102 receives a print completion notification from the image processing apparatus 112 (step 2307), at step 2308 the bibliographic information registration managing unit 407 refers to the bibliographic information table 700 to determine presence/absence of an alternate process. That is, the bibliographic information registration managing unit 407 reads out the bibliographic information table 700, first specifies a user ID corresponding to the notified bibliographic information ID and next checks the specified user ID with the notified user ID to determine whether or not the print is performed by the alternate user. When the user ID is matched with each other, it is determined that the print is not performed by the alternate user. When the user ID is not matched with each other, it is determined that the print is performed by the alternate user, that is, by the alternate process. In a case where it is determined that the print is performed by the alternate process, the process ends as it is, and in a case where it is determined that the print is not performed by the alternate process, the process goes to step 2309.

At step 2309 the print information managing unit 410 determines a delete mode of the print data. The delete mode is in advance set by a manager, and for example, there are four modes of "delete immediately after printing", "delete in a given time after printing", "delete in a given time after registering", and "do not delete automatically". The print information managing unit 410 reads out a content of the print mode set from the auxiliary memory device 403 to determine what mode the set mode is. In a case where it is determined that the delete mode is other than the mode of "delete immediately after printing", the process goes to step 2310.

At step 2310 the print information managing unit 410 registers print date and time of the print data of the notified bibliographic information ID in a print information table (not shown) to end the process. It should be noted that in a case where the delete mode is a mode of "delete in a given time after printing", in a print data deleting process periodically executed, which will be described later, a determination on whether or not a given time elapses after printing is made by referring to the print information table. At a point where the elapse of the given time is confirmed, the deleting process of the print data is executed. On the other hand, in a case where at step 2309 it is determined that the delete mode is a mode of "delete immediately after printing", the process goes to step 2311.

At step 2311 the print information managing unit 410 notifies the image processing apparatus 111 as the storage server of the bibliographic information ID of the print data and requests delete of the print data.

At step 2312 the print data managing unit 311 in the image processing apparatus 111, in response to the delete request from the bibliographic information server 102, deletes a print data corresponding to the received bibliographic information ID from the auxiliary memory device 303.

When the delete of the print data is completed, the print data managing unit 311 notifies the bibliographic information server 102 of the delete completion notification (step 2313).

When at step 2314 the bibliographic information server 102 receives the delete completion notification, the print information managing unit 410 in the bibliographic information server 102 deletes an entry corresponding to the bibliographic information ID to be requested to delete, from the bibliographic information table 700 and the process ends.

In this way, according to the present pull printing process, in a case where the output of the print data is executed by the alternate process, the corresponding print data and the bibliographic information corresponding thereto are not deleted in any case.

It should be noted that in a case where the print button is pushed down in the preview display screen, the similar process is executed, but in this case, since the extraction of the storage location at step 2302 is already completed, it is omitted.

When the pull printing process is completed, the process goes back to step 1512.

(Log Information Display Process)

Similarly when in the print data list screen 1900 displayed at step 1512, a user selects a specific print data (step 1513) and subsequently pushes down the log display button 1904, at step 1516 the log information display process is executed. That is, at step 1516 the log information managing unit 313 performs display of the alternate operation log screen corresponding to the selected print data. However, if the display of the log information is not made at step 1511, since the log by the alternate process does not exist, the log information display process by the present step is based upon an event that the display of the log information is made at step 1511.

Figure 20:
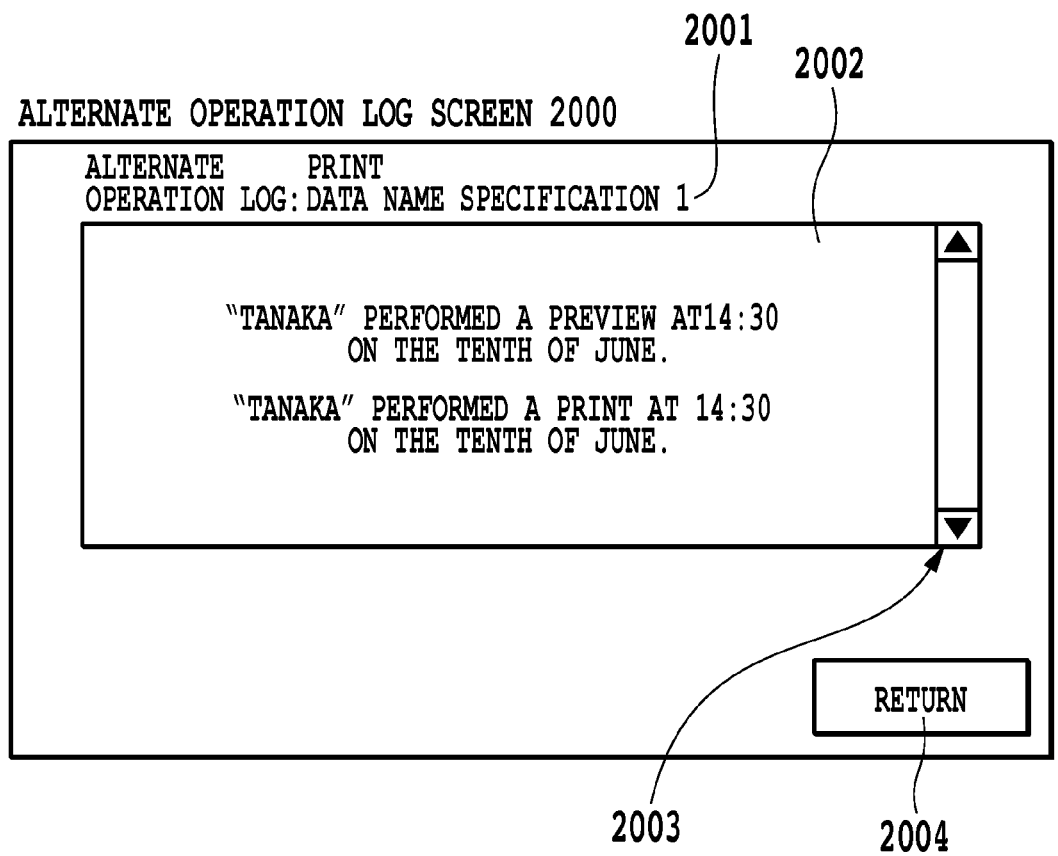
FIG. 20 is a diagram showing an example of an alternate operation log screen.

FIG. 20 is an example of the alternate operation log screen. Reference numeral 2001 on the alternate operation log screen 2000 is a print data name of the print data selected in the print data list screen 1900. Reference numeral 2002 is a log display area, which displays an event that "by which user ID", "when", and "what operation is performed", for each operation. Reference numeral 2003 is a slide bar on the log display area. In a case of many pieces of the alternate operation log information, the slide bar 2003 scrolls the screen, making it possible to display these pieces of the alternate operation log information. Reference numeral 2004 is a return button. When a user pushes down the return button 2004, the display of the alternate operation log screen 2000 ends. When the log information display process ends, the process goes back to step 1512.

(Print Data Deleting Process)

Similarly when in the print data list screen 1900 displayed at step 1512, a user selects a specific print data (step 1513) and subsequently pushes down the delete display button 1907, the deleting process of the print data selected at step 1517 is executed.

Figure 24:
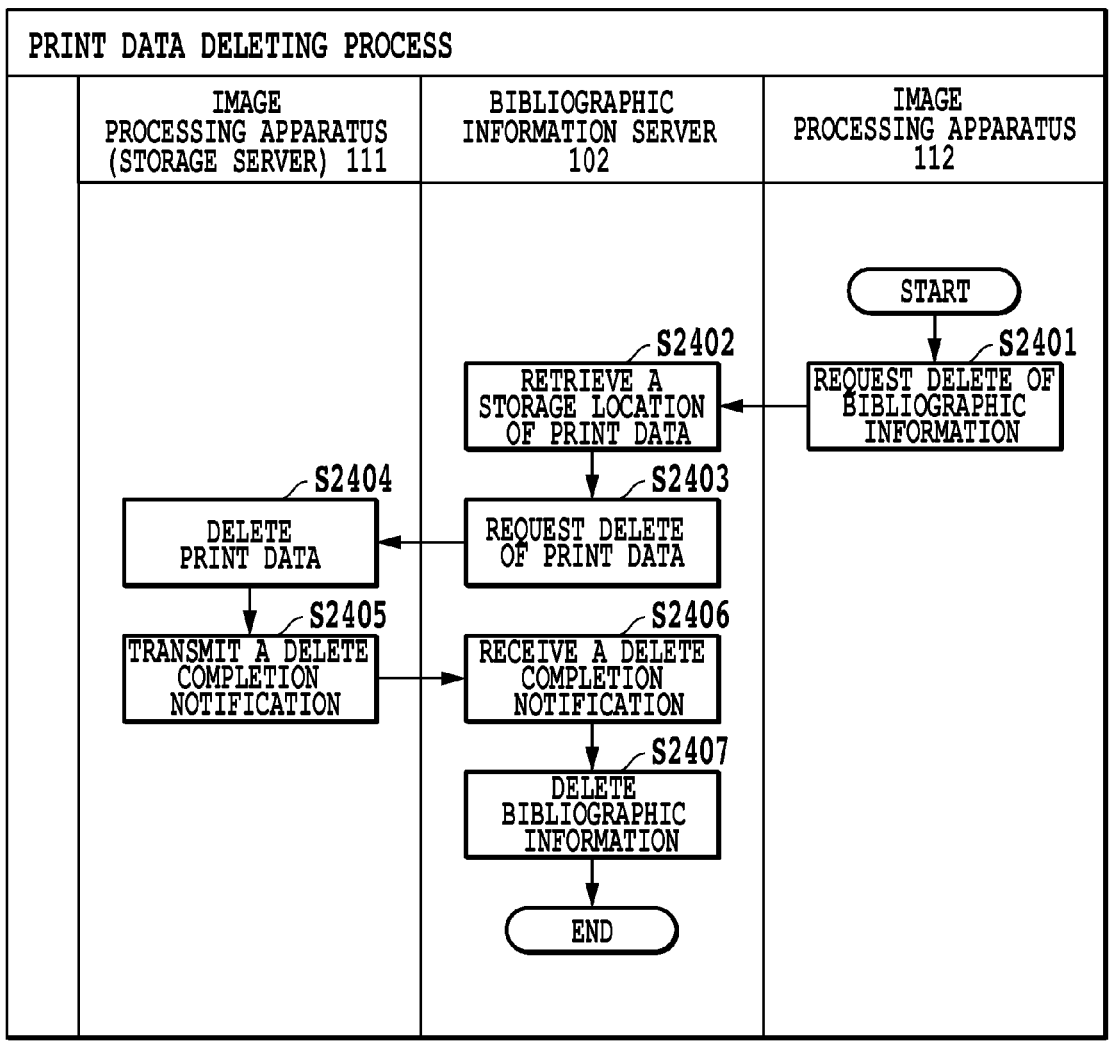
FIG. 24 is a flowchart showing a detail of a print data deleting process.

FIG. 24 is a flow chart showing a detail of the print data deleting process executed at step 1517 in FIG. 15B. It should be noted that step 2401 in FIG. 24 is executed in the image processing apparatus 112. In addition, steps 2404 and 2405 are executed in the image processing apparatus 111 having a function of the storage server. Further, steps 2402, 2403, 2406 and 2407 are executed in the bibliographic information server 102.

First, a user selects a specific print data on the print data list screen 1900 of image processing apparatus 112 and instructs the delete (push down the delete button 1907).

At step 2401 the bibliographic information managing unit 314 in the image processing apparatus 112 notifies the bibliographic information server 102 of bibliographic information ID corresponding to the selected print data and requests delete of the bibliographic information.

At step 2402 the bibliographic information registration managing unit 407 in the bibliographic information server 102 refers to the bibliographic information table 700 to retrieve a storage location of the print data corresponding to the notified bibliographic information ID.

When the storage location is found out, the print information managing unit 410 notifies the storage location of the bibliographic information of the print data and requests delete of the print data (step 2403). Herein, the image processing apparatus 111 acting also as the storage server is the storage location.

At step 22404 the print data managing unit 311 in the image processing apparatus 111 deletes the print data corresponding to the notified bibliographic information ID from the auxiliary memory device 303.

When the delete of the print data is completed, at step 2405 the print data managing unit 311 transmits the delete completion notification to the bibliographic information server 102.

When at step 2407 the bibliographic information server 102 receives the delete completion notification, the print information managing unit 410 in the bibliographic information server 102 deletes an entry corresponding to the bibliographic information ID to be requested to delete, from the bibliographic information table 700 and the process ends.

When the deleting process of the print data is completed, the process goes back to step 1512.

(Alternate Login Process)

Further, when a user pushes down the alternate login button 1909 on the print data list screen 1900 displayed at step 1512, the alternate login process is executed at step 1518.

Figure 25B:
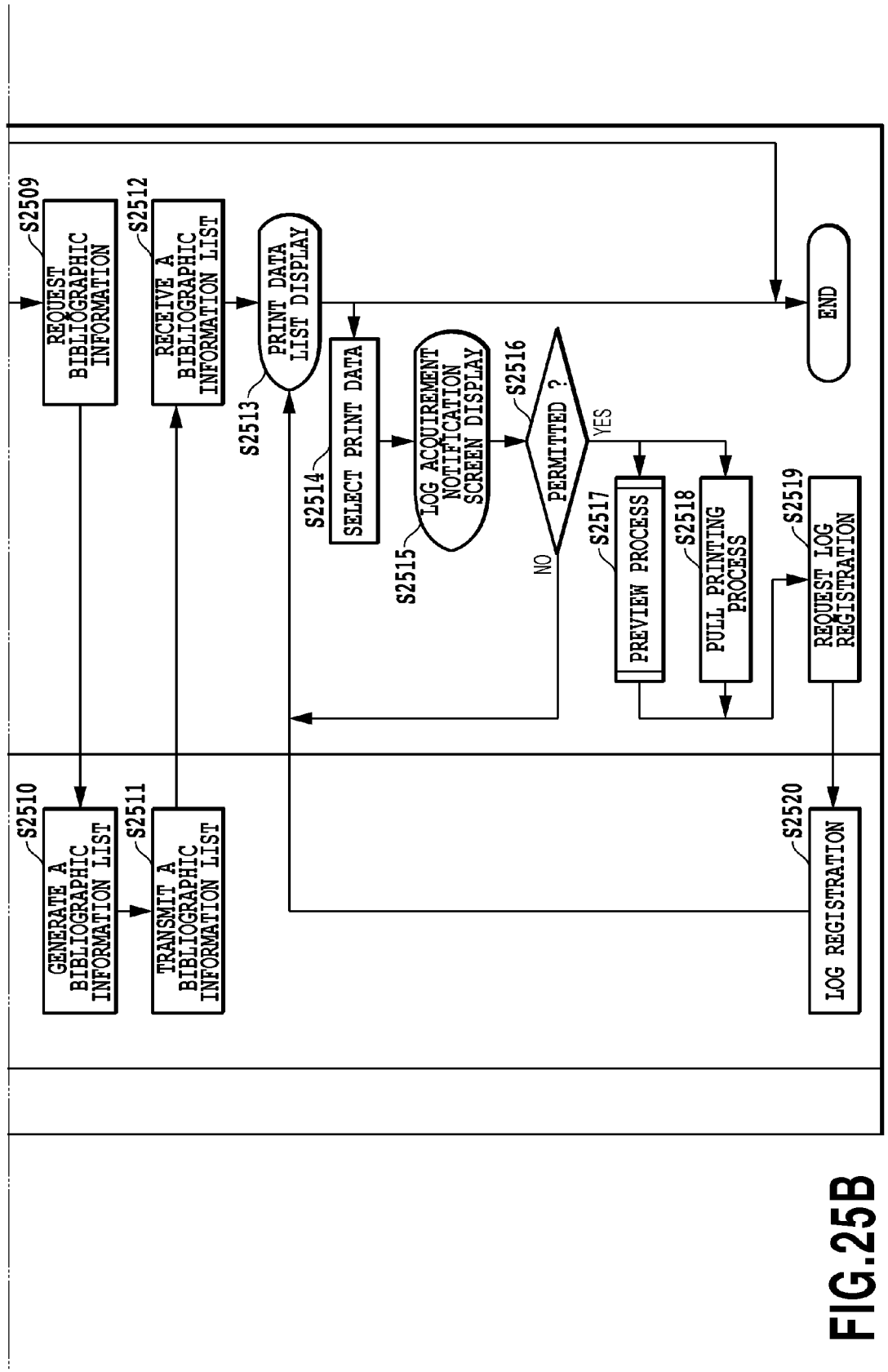

FIGS. 25A and 25B are flow chart showing a detail of the process at the alternate login which is executed at step 1518 in FIG. 15B. It should be noted that steps 2501 to 2504, 2507 to 2509 and 2512 to 2519 in FIGS. 25A and 25B are executed in the image processing apparatus 112. In addition, steps 2505, 2506, 2510, 2511 and 2520 are executed in the bibliographic information server 102.

First, when a user pushes down the alternate login button 1909 on the print data list screen 1900 in the image processing apparatus 112, at step 2501 the log information managing unit 313 displays a log acquirement notification screen on the image display device 304. That is, the log information managing unit 313 performs the display for confirming a user's intention on whether to continue the alternate login after informing the user that the history of the login authentication and the history of the operations during the alternate process after the login are notified to an alternated user (user which has acquired alternate authority).

Figure 26:
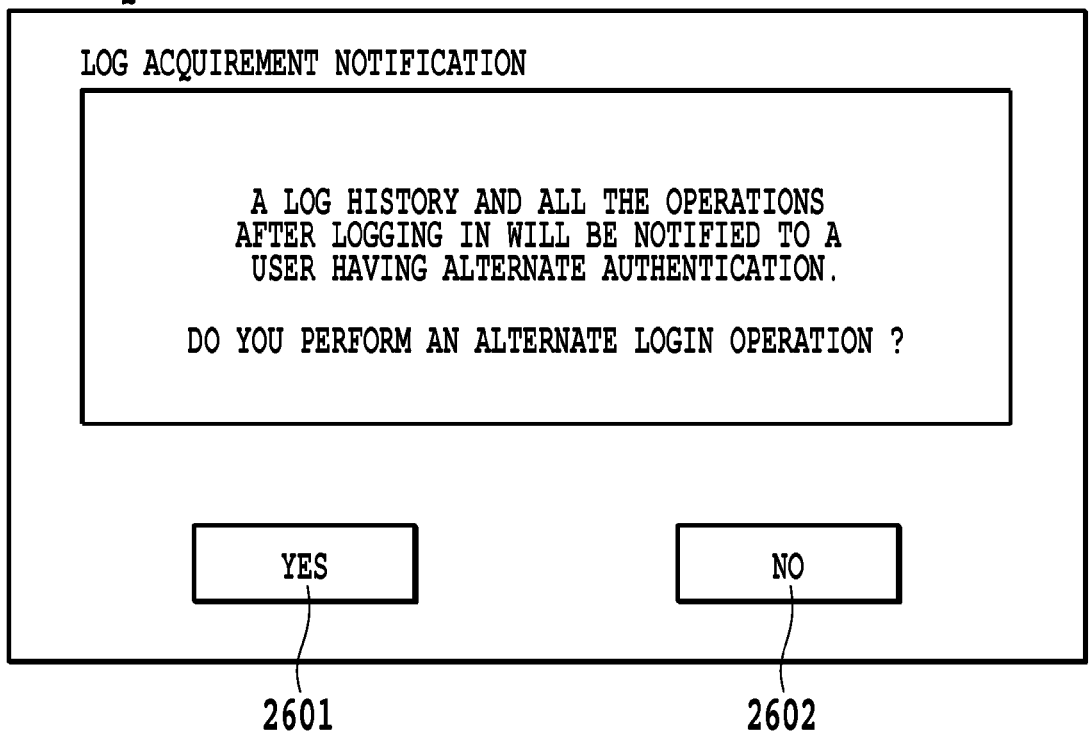
FIG. 26 is a diagram showing an example of a log acquirement notification screen.

FIG. 26 is an example of the log acquirement notification screen displayed at step 2501. Reference numeral 2601 on the log acquirement notification screen 2600 is a button for selection in a case of continuing the alternate login process, and reference numeral 2602 is a button for selection in a case of not continuing the alternate login process.

At step 2502 the log information managing unit 313 determines which button is selected in the log acquirement notification screen 2600. In a case where the button 2601 is selected, it is determined that the user's intention of continuing the login authentication for executing the alternate processing can be confirmed and the process goes to step 2503. In a case where the button 2602 is selected, it is determined that there is no user's intention of continuing the login authentication and the process ends.

At step 2503 the user authentication unit 312 displays the alternate login authentication screen on the image display device 304.

Figure 27:
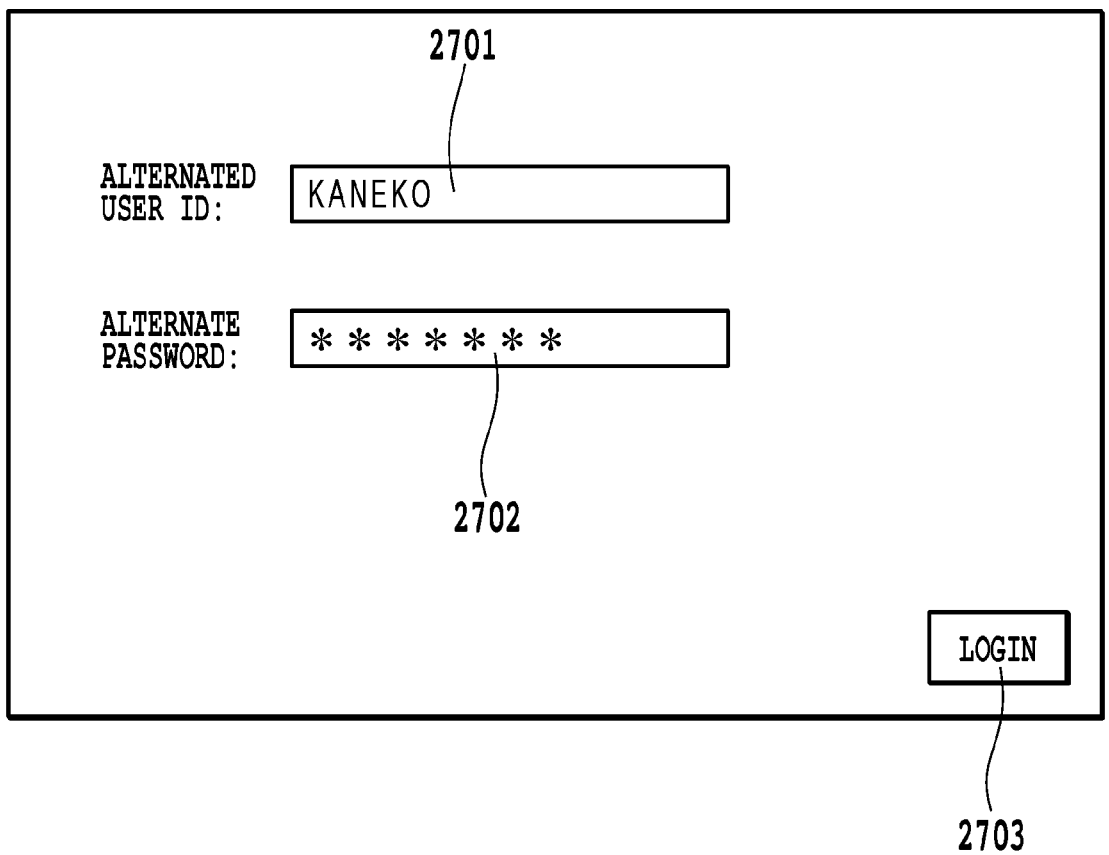
FIG. 27 is a diagram showing an example of an alternate login authentication screen.

FIG. 27 is an example of the alternate login authentication screen. Reference numeral 2701 on an alternate login authentication screen 2700 is an area to which a user during login inputs user ID of a user desiring to acquire alternate authority from now on, that is, an alternated user. Reference numeral 2702 is an area for inputting an alternate password. Reference numeral 2703 is a login button. When a user inputs the alternated user ID to the input area 2701 and the alternate password to the input area 2702 and pushes down the login button, the process goes to step 2504.

At step 2504 the user authentication unit 312 notifies the bibliographic information server 102 of the inputted user ID and alternate password and requests the login authentication for the alternate process.

At step 2505 the user authentication unit 409 in the bibliographic information server 102 refers to the alternate password managing table 900 to check the notified user ID with the notified alternate password, determining whether to permit login for the alternate process (step 2551). That is, it is checked whether or not a combination of the notified user ID and the notified alternate password is registered in the alternate password managing table. When it is registered, the login is permitted.

At step 2506 the log information registration managing unit 408 registers the authentication result of the alternate login in the log information table 1000 and along with it the user authentication unit 410 notifies the image processing apparatus 112 of the authentication result.

The user authentication unit 312 in the image processing apparatus 112 receives the authentication result (step 2507) and at step 2508 determines whether the notified authentication result is "OK" or "NG". When it is "OK", it is determined that the user is in a login state where the alternate process in regard to the user ID inputted on the alternate login authentication screen 2700 is possible, the process goes to step 2509. When it is "NG", an event that the login authentication for the alternate process fails is displayed on the image display device 304, which is thereby notified to the user and the process goes back to step 2503.

At step 2509 the bibliographic information managing unit 314 notifies the bibliographic information server 102 of the user ID of the user during login at present and the user ID of the alternated user and requests the bibliographic information list in regard to the alternated user ID. By notifying two pieces of the user ID of the login user and the alternated user, the bibliographic information server 102 can recognize that the image processing apparatus 112 is during the alternate process.

At step 2510 the bibliographic information registration managing unit 407 in the bibliographic server 102 reads out the bibliographic information table 700, extracts the bibliographic information corresponding to the notified alternated user ID and generates a bibliographic information list 800.

At 2511 the bibliographic information registration managing unit 407 transmits the generated bibliographic information list to the image processing apparatus 112.

When the bibliographic information managing unit 314 in the image processing apparatus 112 receives the bibliographic information list from the bibliographic information server 102 (step 2512), the bibliographic information managing unit 314 displays a list screen of the print data contained in the bibliographic information list (2513).

Figure 28:
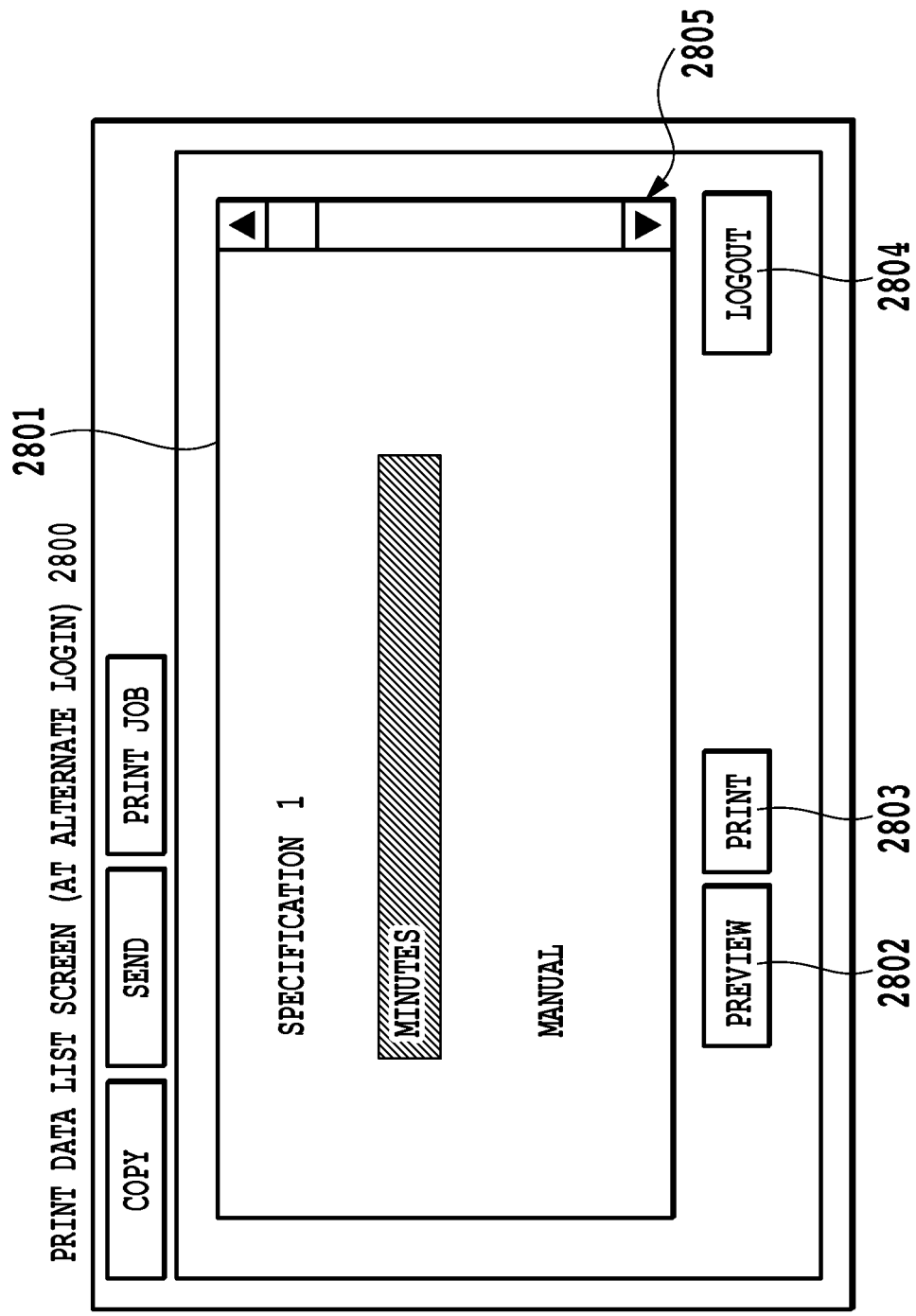
FIG. 28 is a diagram showing an example of a print data list screen at alternate login.
Figure 29:
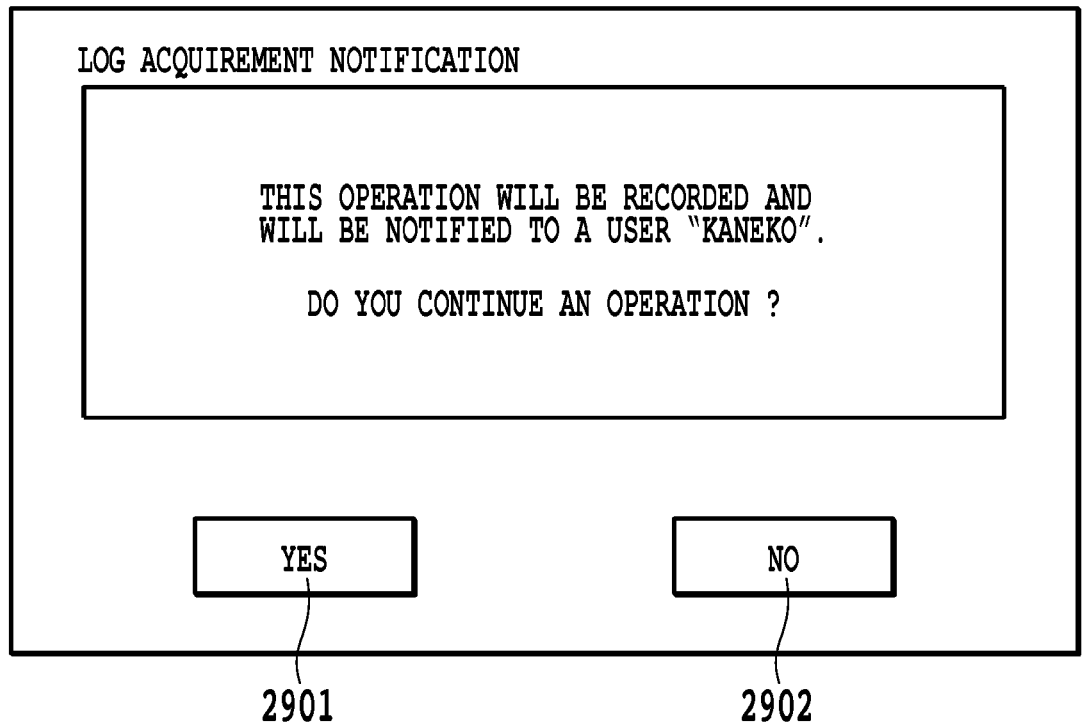
FIG. 29 is a diagram showing an example of a log acquirement notification screen.

FIG. 28 is an example of a print data list screen at an alternate login time. Reference numeral 2801 on the print data list screen 2800 is a print data list display area which displays a list of the print data corresponding to the bibliographic information list acquired from the bibliographic information server 102. A user can select a specific print data from the print data list and the selected data has a portion of the print data name which is displayed to be highlighted. In an example of FIG. 28, the print data of the print data name "minutes" is selected. Reference numeral 2802 is a preview button. When a user pushes down the preview button, a detail preview of the selected print data is displayed. Reference numeral 2803 is a print button. When a user pushes down the print button, the aforementioned pull printing process of the selected print data is executed. Reference numeral 2805 is a slide bar of the print data list display area 2801. When a print data list to be displayed in the print data list display area 2801 can not be accommodated within a single screen, the scroll display is made possible. Reference numeral 2804 is a logout button. When a user pushes down this button, the user logs out from the alternate login state. Different from the print data list screen 1900 at a usual time, the thumbnail screen is not displayed and the log information display button and the delete button do not exist thereon. The thumbnail image is thus not displayed at the alternate login, and thereby information more than necessary can be prevented from being provided to the alternate user. In addition, since the delete button of the print data is not displayed at the alternate login time, an event that an important print data is deleted by the alternate user can be prevented.

The print data managing unit 311 executes a process in response to the button 2802 or 2803 pushed down after a user selects any one of the print data (step 2514). However, the log information managing unit 313, which is different from the process at the usual login (FIGS. 15A and 15B), displays a log acquirement notification screen in the image display device 304 at step 2515 before starting execution of each process. That is, the log information managing unit 313 newly displays an instruction that the operation history is recorded, which is notified to an alternated user.

At step 2516 the log information managing unit 313 makes an determination on which button is selected on the log acquirement notification screen 2900. In a case where the button 2901 is selected, it is determined that a user's intention of the operation continuation is confirmed and in response to the subsequent button selection, the process goes to step 2517 or step 2518. In a case where the button 2902 is selected, the process goes back to step 2513.

In a case where at step 2516 the user's intention of the operation continuation is confirmed and subsequently the preview button 2802 is pushed down, the preview process is executed at step 2517. In a case where the print button 2803 is pushed down, the pull printing process is executed at step 2518. Since the content of both the processes is already explained, it is here omitted.

At step 2519 the log information managing unit 313 requests the bibliographic information server 102 for registration of the log. Specially the log information managing unit 313 acquires logs of the bibliographic information ID corresponding to the selected print data, the user ID of the user executing the alternate process at this time, and the operation content (preview process or pull printing process), notifies the bibliographic information server 112 of the logs and requests registration of these logs thereto.

At step 2520 the log information registration managing unit 408 in the bibliographic information server 102 associates the notified bibliographic information with the notified user ID, which are registered in the log information table 1000. After the registering, the process goes back to step 2513.

It should be noted that when a user selects the logout button 2804 on the print data list screen 2900 displayed at step 2513, the logout process is executed and the user goes out of the login state for the alternate process.

According to the present embodiment, the user who has registered its own print data in the pull printing system is only required to inform an alternate password in advance set upon requesting an alternate print.

In addition, the other user performing an alternate print acquires a log at the time of login and at the time of accessing a print data for performing the alternate print, information that the corresponding log information is notified to a user who has requested the alternate print is displayed, and based thereon, the approval by the user is required to acquire. This arrangement makes it psychologically difficult for the other user to arbitrarily access the print data which is not requested for the alternate print.

Further, the user performing the alternate print logs in to the printing device by its own user ID and performs the alternate login by the alternate password known by an alternated user. Therefore, in a case where a third party who is not let know the alternate password attempts the alternate login by trial and error, the user ID of the third party remains as the log, as a result making it possible to prevent the login by trail and error by the third party.

In addition, since the print data existing in the storage server are not deleted in the printing process by the alternate process, even if the other user prints the print data not requested, either intentionally or by negligence, the user registering the print data can continue to perform the print.

Second Embodiment

Next, a second embodiment will be explained.

A system arrangement in the second embodiment is the same as in the first embodiment and the process thereof is also substantially in common with that of the first embodiment. Therefore, difference points from the first embodiment will be mainly explained.

Figure 30:
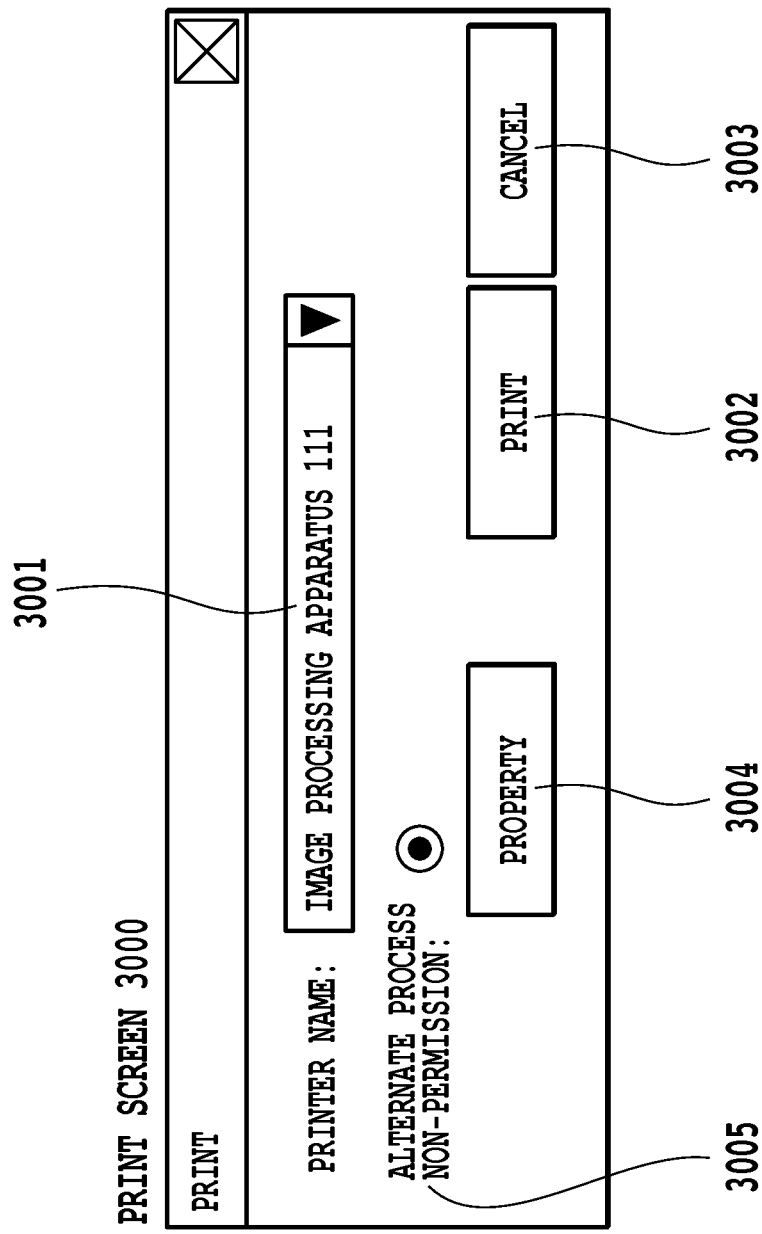
FIG. 30 is a diagram showing an example of a print screen according to a second embodiment.

A point in which the second embodiment is largely different from the first embodiment is a point where at the time of registering print data in the pull printing system, "an alternate process non-permission flag" prohibiting an alternate process by the other user can be set to the print data. FIG. 30 is an example of a print screen displayed at step 1301 in a flow chart of FIG. 13 in a print data registering process according to the second embodiment. Reference numeral 3001 on a print screen 3000 is a transmission destination printer designation area, reference numeral 3002 is a print button, reference numeral 3003 is a cancellation button, and reference numeral 3004 is a property button for detail setting. These buttons are in common with those on the print screen 1400 in FIG. 19 according to the first embodiment. However, a radio button 3005 for setting alternate print non-permission exists on the print screen 3000. In a case of desiring to set non-permission to an alternate process in regard to a particular print data, when a user selects this button, an inside of a circle is in a state as marked out as shown in FIG. 30. Here, a case where the non-permission of the alternate process is selected will be explained.

Via step 1302, at step 1303 the print data generation managing unit 209 generates print data to be transmitted to the image processing apparatus 111 acting as the storage server, but the print data here generated is also different from that of the first embodiment. That is, to the data generated by the application, the print data to which not only the user ID acquired at step 1302 but also a state of the radio button 3005 showing YES/NO of the alternate process are applied is to be generated.

In addition, via steps 1304 to 1306, at step 1307 the bibliographic information managing unit 319 extracts the user ID from the print data to generate the bibliographic information as shown in FIG. 31. The bibliographic information 3100 in FIG. 31 contains number 3101 showing a print data name, number 3102 showing a storage location, number 3103 showing user ID, and further number 3104 showing a state of an alternate process non-permission flag (here, "ON"). It goes without saying that similarly to the bibliographic information 600 in FIG. 6, besides, registration data and time of the print data, a thumbnail image of the print data and the like may be contained.

Thereafter, via steps 1308 and 1309, the bibliographic information registration managing unit 407 in the bibliographic information server 102 registers the received bibliographic information in a bibliographic information table 3200 in FIG. 32 (or newly produces) and stores it in the auxiliary memory device 203 to end the process (step 1310). The bibliographic information table 3200 in FIG. 32, in addition to the items existing in the bibliographic information table in FIG. 7 according to the first embodiment, contains an item 3201 showing a state of the alternate process non-permission flag.

Followed by it, a process at the alternate login in the second embodiment will be explained.

Also in regard to the process content at the alternate login, by referring to the flow chart in FIGS. 25A and 25B explained in the first embodiment, the difference points will be mainly explained. It should be noted that the process at the usual login where the process at the alternate login is called out is the same as in a case of the first embodiment shown in the flow chart in FIGS. 15A and 15B.

Steps 2501 to 2509 in the second embodiment are the same as in the first embodiment.

At step 2510 the bibliographic information registration managing unit 407 in the bibliographic information server 102 extracts only a print data in which the alternate process non-permission flag is OFF, from the bibliographic information table 3200 among the bibliographic information ID relating to the notified user ID and generates the bibliographic information list. That is, in a case where the notified user ID is "kaneko", the bibliographic information list extracting the bibliographic information that the user ID is "kaneko" and the alternate process non-permission flag is "OFF" is generated from the bibliographic information table 3200. FIG. 33 is an example of the bibliographic information list in a case of the present embodiment, where among the print data where the user ID is "kaneko", a print data of bibliographic information ID "02011" where the alternate process non-permission flag is "ON" is not contained.

Hereinafter, by using the bibliographic information list generated as described above, the process similar to the first embodiment is executed.

In this way, according to the second embodiment, a user registering print data in the pull printing system can set any print data in such a manner as not to be an object of an alternate process at registering. Accordingly there can be provided a pull printing system with higher security and higher userability in the pull printing system.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-090288, filed Apr. 2, 2009, which is hereby incorporated by reference herein in its entirety.

What is claimed is:

1. An image processing system, comprising:
a storage server for storing print data;
an image processing apparatus in which a logged-in first user is able to access print data stored in the storage server by a second user different from the first user; and
a bibliographic information server for managing bibliographic information of the print data stored in the storage server,
wherein the image processing apparatus comprises:
a bibliographic information management unit configured to acquire the bibliographic information of the print data from the bibliographic information server such that the print data stored by the second user in the storage server is displayed to the first user once the second user confirms that the first user is authorized to access the print data stored in the storage server by the second user;
a display unit configured to display on a display screen, a list of bibliographic information of the print data acquired by the bibliographic information management unit; and
a print data acquiring unit configured to acquire the print data from the storage server for printing; and
wherein the bibliographic information server comprises:
a deletion unit configured to request the storage server to delete print data printed by the image processing apparatus, wherein in a case where the print data printed by the image processing apparatus is the print data stored in the storage server by the second user and is printed according to an instruction to print the print data given from the first user, the deletion of the print data is not requested to the storage server.

2. The image processing system according to claim 1, wherein the image processing apparatus further comprises a log information managing unit configured to acquire a log of an operation carried out by the first user accessing the print data stored by the second user in the storage server, wherein, the log information managing unit notifies the first user that a log of login authentication for accessing the print data stored in the storage server by the second user is acquired and/or the log of an operation carried out by accessing the print data stored in the storage server by the second user is acquired.

3. The image processing system according to claim 1, wherein the bibliographic information management unit is configured to notify the bibliographic information server of a user ID of the first user to which the authority to access is confirmed and a user ID of the second user, thereby acquiring from the bibliographic information server the bibliographic information of the print data stored by the second user in the storage server.

4. The image processing system according to claim 1, wherein the bibliographic information server further comprises a log information registration management unit for registering a log of login authentication for accessing the print data stored in the storage server by the second user and/or a log of an operation carried out by accessing the print data stored in the storage server by the second user, wherein the image processing apparatus acquires information of a log relating to the second user from the bibliographic information server when the second user logs into the image processing apparatus, and notifies the second user of information of an existing log in a case where the log of the login authentication for accessing the print data stored in the storage server by the second user and/or the log of the operation carried out by accessing the print data stored in the storage server by the second user exist.

5. The image processing system according to claim 1, wherein in a case where the print data stored in the storage server by the second user is accessed and printed by the first user, the image processing apparatus notifies the bibliographic information server of the completion of the printing together with a bibliographic information ID specifying the print data and a user ID of the first user performing the print, after the printing is completed.

6. The image processing system according to claim 1, wherein the print data stored in the storage server by the second user includes a flag showing whether or not access by the first user is possible.

7. The image processing system according to claim 1, wherein the display unit performs a display containing a thumbnail image of each print data in displaying the list of the print data, and performs a display not containing a thumbnail image of the print data when the first user operates by accessing the print data stored in the storage server by the second user.

8. A method of controlling an image processing system including a storage server for storing print data, an image processing apparatus in which a logged-in first user is able to access print data stored in the storage server by a second user different from the first user, and a bibliographic information server for managing bibliographic information of the print data stored in the storage server, the method comprising:

in the image processing apparatus,
acquiring the bibliographic information of the print data from the bibliographic information server such that the print data stored in the storage server by the second user is displayed to the first user once the second user confirms that the first user is authorized to access the print data stored in the storage server by the second user;
displaying on a display screen, a list of bibliographic information of the print data acquired in the acquiring step; and
acquiring the print data from the storage server for printing; and in the bibliographic information server,
requesting the storage server to delete print data printed by the image processing apparatus, wherein in a case where the print data printed by the image processing apparatus is the print data stored in the storage server by the second user and is printed according to an instruction to print the print data given from the first user, the deletion of the print data is not requested to the storage server.

9. A non-transitory computer readable storage medium on which is stored computer-executable code of a program that, when executed by a computer, causes the computer to perform the method according to claim 8.

* * * * *